US009451178B2

(12) United States Patent
Kelder et al.

(10) Patent No.: US 9,451,178 B2
(45) Date of Patent: Sep. 20, 2016

(54) AUTOMATIC INSERTION OF VIDEO INTO A PHOTO STORY

(71) Applicant: Microsoft Technology Licensing, LLC, Redmond, WA (US)

(72) Inventors: Mart Kelder, Los Altos, CA (US); Michael J. Lammers, Redwood City, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/285,237

(22) Filed: May 22, 2014

(65) Prior Publication Data
US 2015/0341572 A1 Nov. 26, 2015

(51) Int. Cl.
H04N 5/262 (2006.01)
H04N 5/225 (2006.01)
H04N 5/926 (2006.01)
H04R 1/08 (2006.01)
H04N 5/232 (2006.01)

(52) U.S. Cl.
CPC .......... *H04N 5/2621* (2013.01); *H04N 5/2254* (2013.01); *H04N 5/23216* (2013.01); *H04N 5/23245* (2013.01); *H04N 5/9265* (2013.01); *H04R 1/08* (2013.01); *H04R 2499/11* (2013.01)

(58) Field of Classification Search
CPC ............... H04N 5/343; H04N 5/2621; H04N 5/23245; H04N 5/23216; H04N 5/2254; H04N 5/9265; G08B 13/19669; H04R 1/08; H04R 2499/11
See application file for complete search history.

(56) References Cited

U.S. PATENT DOCUMENTS

| 3,305,148 | A | 2/1967 | Zimmerman |
| 5,282,044 | A | 1/1994 | Misawa et al. |
| 5,610,678 | A | 3/1997 | Tsuboi et al. |
| 6,058,141 | A | 5/2000 | Barger et al. |
| 6,168,057 | B1 | 1/2001 | Schwabe |
| 6,252,389 | B1 | 6/2001 | Baba et al. |
| 6,275,829 | B1 | 8/2001 | Angiulo et al. |
| 6,558,050 | B1 | 5/2003 | Ishibashi |
| 6,561,702 | B1 | 5/2003 | Yik |
| 6,612,404 | B2 | 9/2003 | Sweet et al. |

(Continued)

FOREIGN PATENT DOCUMENTS

| CN | 202838971 | 3/2013 |
| EP | 0985899 | 3/2000 |

(Continued)

OTHER PUBLICATIONS

"International Search Report and Written Opinion", Application No. PCT/US2014/022896, Jun. 16, 2014, 13 Pages.

(Continued)

*Primary Examiner* — Mekonnen Dagnew
(74) *Attorney, Agent, or Firm* — Tom Wong; Micky Minhas

(57) ABSTRACT

Various embodiments provide a capture device, e.g., a camera, that is configured to have multiple capture modes including an image capture mode and a video capture mode. The capture device can be set to the image capture mode in which images or photos are periodically, automatically captured. Upon detection of a particular event, such as an audibly detectable event, the capture device automatically triggers the video capture mode and begins to capture video. After a period of time, the capture device can transition back to the image capture mode. Transition to the image capture mode can occur in various ways, e.g., after passage of a period of time, after the audibly detectable event terminates or attenuates, by way of user input and the like. In some embodiments, the capture device can be embodied as a wearable camera that is worn by a user.

20 Claims, 17 Drawing Sheets

(56) References Cited

U.S. PATENT DOCUMENTS

| | | | |
|---|---|---|---|
| D483,784 S | 12/2003 | Ting | |
| 6,667,771 B1 | 12/2003 | Kweon | |
| 6,680,748 B1 | 1/2004 | Monti | |
| 6,711,297 B1 | 3/2004 | Chang et al. | |
| 6,727,949 B1 | 4/2004 | Saruwatari et al. | |
| 6,757,027 B1 | 6/2004 | Edwards et al. | |
| 6,867,680 B1 | 3/2005 | Kulle | |
| 6,904,185 B1 | 6/2005 | Wilkins et al. | |
| 7,012,621 B2 | 3/2006 | Crosby et al. | |
| 7,092,614 B2 | 8/2006 | Liebhold et al. | |
| 7,116,440 B2 | 10/2006 | Eichhorn et al. | |
| D534,939 S | 1/2007 | Sheehan et al. | |
| 7,280,702 B2 | 10/2007 | Chang et al. | |
| 7,326,869 B2 | 2/2008 | Flynn et al. | |
| 7,454,711 B2 | 11/2008 | Angiulo et al. | |
| 7,490,721 B2 | 2/2009 | Bishop | |
| 7,512,886 B1 | 3/2009 | Herberger et al. | |
| 7,574,129 B2 | 8/2009 | Tsukuda | |
| 7,623,182 B2 | 11/2009 | Byrne et al. | |
| 7,778,023 B1 | 8/2010 | Mohoney | |
| 7,783,133 B2 | 8/2010 | Dunki-Jacobs et al. | |
| 8,031,255 B2 | 10/2011 | Usami | |
| 8,083,146 B2 | 12/2011 | Carlson et al. | |
| 8,159,363 B2 | 4/2012 | Song | |
| 8,159,541 B2 | 4/2012 | McLeod | |
| 8,270,827 B2 | 9/2012 | Tse, Jr. | |
| 8,322,215 B2 | 12/2012 | Lakich et al. | |
| 8,330,854 B2 | 12/2012 | Kossin | |
| 8,355,619 B2 | 1/2013 | Kato et al. | |
| 8,363,121 B2 | 1/2013 | Maeng | |
| 8,374,498 B2 | 2/2013 | Pastore | |
| 8,514,292 B2 | 8/2013 | Cho | |
| 8,515,241 B2 | 8/2013 | Forsyth et al. | |
| 8,538,376 B2 | 9/2013 | Lee et al. | |
| 8,587,670 B2 | 11/2013 | Wood et al. | |
| 8,605,188 B2 | 12/2013 | Ishihara et al. | |
| 8,979,398 B2 | 3/2015 | Han et al. | |
| 8,990,199 B1 | 3/2015 | Ramesh et al. | |
| 9,282,244 B2 | 3/2016 | Chau et al. | |
| 2002/0140849 A1 | 10/2002 | Slatter et al. | |
| 2002/0186317 A1 | 12/2002 | Kayanuma | |
| 2003/0081121 A1 | 5/2003 | Kirmuss | |
| 2003/0234860 A1 | 12/2003 | Sung et al. | |
| 2004/0056949 A1 | 3/2004 | Lin | |
| 2004/0089814 A1 | 5/2004 | Cheatle | |
| 2004/0105024 A1 | 6/2004 | Takahashi | |
| 2004/0155968 A1 | 8/2004 | Cheatle et al. | |
| 2004/0169883 A1 | 9/2004 | Eichhorn et al. | |
| 2004/0183912 A1 | 9/2004 | Szolyga et al. | |
| 2004/0189691 A1 | 9/2004 | Jojic et al. | |
| 2004/0218081 A1 | 11/2004 | Lohr et al. | |
| 2004/0240005 A1 | 12/2004 | Kim | |
| 2005/0093988 A1* | 5/2005 | Haas | H04N 5/23245 348/220.1 |
| 2005/0100329 A1 | 5/2005 | Lao et al. | |
| 2005/0140798 A1 | 6/2005 | Tashiro et al. | |
| 2005/0207733 A1 | 9/2005 | Gargi | |
| 2005/0248453 A1 | 11/2005 | Fechter | |
| 2006/0066753 A1 | 3/2006 | Gennetten et al. | |
| 2006/0078215 A1 | 4/2006 | Gallagher | |
| 2006/0140599 A1 | 6/2006 | Nomura et al. | |
| 2006/0165160 A1 | 7/2006 | Winningstad et al. | |
| 2006/0173560 A1 | 8/2006 | Widrow | |
| 2006/0197843 A1 | 9/2006 | Yoshimatsu | |
| 2006/0268162 A1 | 11/2006 | Kayanuma | |
| 2007/0071423 A1 | 3/2007 | Fantone et al. | |
| 2007/0214886 A1 | 9/2007 | Sheynblat | |
| 2007/0291177 A1 | 12/2007 | Lahoz et al. | |
| 2008/0055427 A1* | 3/2008 | Wendelrup | H04M 1/72522 348/231.2 |
| 2008/0136940 A1 | 6/2008 | Srikanth et al. | |
| 2008/0165249 A1 | 7/2008 | DeKeyser | |
| 2008/0180537 A1 | 7/2008 | Weinberg et al. | |
| 2008/0259174 A1 | 10/2008 | Nagao | |
| 2008/0260291 A1 | 10/2008 | Alakarhu et al. | |
| 2008/0313172 A1 | 12/2008 | King et al. | |
| 2009/0115865 A1 | 5/2009 | Kamada et al. | |
| 2009/0117946 A1 | 5/2009 | Tomasini et al. | |
| 2009/0196493 A1 | 8/2009 | Widrow et al. | |
| 2010/0026716 A1 | 2/2010 | Garbow et al. | |
| 2010/0026839 A1 | 2/2010 | Border et al. | |
| 2010/0027663 A1 | 2/2010 | Dai et al. | |
| 2010/0053348 A1 | 3/2010 | Yoshimoto et al. | |
| 2010/0079356 A1 | 4/2010 | Hoellwarth | |
| 2010/0107126 A1 | 4/2010 | Lin et al. | |
| 2010/0118158 A1 | 5/2010 | Boland et al. | |
| 2010/0175088 A1 | 7/2010 | Loebig et al. | |
| 2010/0194682 A1 | 8/2010 | Orr et al. | |
| 2010/0208370 A1 | 8/2010 | Chang | |
| 2010/0289904 A1 | 11/2010 | Zhang et al. | |
| 2010/0306402 A1 | 12/2010 | Russell et al. | |
| 2010/0316369 A1 | 12/2010 | Pyle | |
| 2011/0064129 A1 | 3/2011 | Bennett et al. | |
| 2011/0070829 A1 | 3/2011 | Griffin et al. | |
| 2011/0084661 A1 | 4/2011 | Saw | |
| 2011/0149094 A1 | 6/2011 | Chen et al. | |
| 2011/0152629 A1 | 6/2011 | Eaton et al. | |
| 2011/0158623 A1 | 6/2011 | Cheng et al. | |
| 2011/0211061 A1 | 9/2011 | Kossin | |
| 2012/0063736 A1 | 3/2012 | Simmons et al. | |
| 2012/0086819 A1 | 4/2012 | Wilson et al. | |
| 2012/0140093 A1 | 6/2012 | Chuang | |
| 2012/0206653 A1 | 8/2012 | Graves et al. | |
| 2012/0290840 A1 | 11/2012 | Willins | |
| 2012/0297334 A1 | 11/2012 | Fagans et al. | |
| 2012/0320224 A1 | 12/2012 | Miyoshi et al. | |
| 2013/0014585 A1 | 1/2013 | Hetherington | |
| 2013/0057489 A1 | 3/2013 | Morton et al. | |
| 2013/0063538 A1 | 3/2013 | Hubner et al. | |
| 2013/0069985 A1 | 3/2013 | Wong et al. | |
| 2013/0148940 A1 | 6/2013 | Schmit et al. | |
| 2013/0201344 A1 | 8/2013 | Sweet et al. | |
| 2013/0229562 A1 | 9/2013 | Kamada et al. | |
| 2013/0239001 A1 | 9/2013 | Maloney et al. | |
| 2013/0315556 A1 | 11/2013 | Ju et al. | |
| 2013/0328051 A1 | 12/2013 | Franklin et al. | |
| 2014/0037216 A1 | 2/2014 | Kumar et al. | |
| 2014/0071091 A1 | 3/2014 | Barak et al. | |
| 2014/0072312 A1 | 3/2014 | Aldana et al. | |
| 2014/0092299 A1 | 4/2014 | Phillips et al. | |
| 2014/0191707 A1 | 7/2014 | Carreon et al. | |
| 2014/0211031 A1 | 7/2014 | Han | |
| 2014/0218493 A1 | 8/2014 | Dialameh et al. | |
| 2014/0270688 A1 | 9/2014 | Han | |
| 2014/0270689 A1 | 9/2014 | Chau | |
| 2014/0308031 A1 | 10/2014 | Han et al. | |
| 2014/0333828 A1 | 11/2014 | Han et al. | |
| 2014/0354880 A1 | 12/2014 | Han | |
| 2015/0054975 A1 | 2/2015 | Emmett et al. | |
| 2015/0077552 A1* | 3/2015 | Yang | H04N 5/2252 348/143 |
| 2015/0256749 A1* | 9/2015 | Frey | H04N 5/23245 348/220.1 |
| 2015/0341559 A1 | 11/2015 | Kelder et al. | |
| 2015/0341591 A1 | 11/2015 | Kelder et al. | |
| 2016/0119544 A1 | 4/2016 | Chau et al. | |

FOREIGN PATENT DOCUMENTS

| | | |
|---|---|---|
| EP | 1571634 | 9/2005 |
| EP | 2091247 | 8/2009 |
| EP | 2160019 | 3/2010 |
| GB | 2456587 | 7/2009 |
| JP | 2006129391 | 5/2006 |
| JP | 2009110351 | 5/2009 |
| WO | WO-03005702 | 1/2003 |
| WO | WO-2014149664 | 9/2014 |

OTHER PUBLICATIONS

"International Search Report and Written Opinion", Application No. PCT/US2014/037406, Aug. 4, 2014, 13 Pages.

"International Search Report and Written Opinion", Application No. PCT/US2014/022892, Jul. 1, 2014, 14 Pages.

(56) References Cited

OTHER PUBLICATIONS

"International Search Report and Written Opinion", Application No. PCT/US2014/040110, Aug. 14, 2014, 14 Pages.
"Non-Final Office Action", U.S. Appl. No. 13/754,719, Jul. 9, 2014, 15 pages.
"Non-Final Office Action", U.S. Appl. No. 13/828,139, Aug. 7, 2014, 20 pages.
"Non-Final Office Action", U.S. Appl. No. 13/873,069, Jul. 25, 2014, 17 pages.
"Non-Final Office Action", U.S. Appl. No. 13/892,085, Sep. 4, 2014, 19 pages.
"Canon VIXIA HF R200 Full HD Camcorder with Dual SDXC Card", Retrieved from <http://www.amazon.com/Canon-VIXIA-R200-Camcorder-Slots/dp/B004HW7EAG> on Mar. 20, 2013, 9 pages.
"Canon: Ease of Use", Retrieved from: <http://www.usa.canon.com/cusa/consumer/standard_display/PS_Advantage_Ease> on Feb. 11, 2014, Mar. 12, 2011, 17 pages.
"DVR003 Mini Camera Stick HD Mini Camera and Video Recorder", Retrieved from <http://www.spyville.com/dvr003-lawmate-camstick.html> on Apr. 16, 2013, 2013, 2 pages.
"GeniusGuard™ Pen Spy Camera Recorder Model S3K", Retrieved from <http://www.eurekaplus.com/pen-spycam-recorder-s3k.html> on Apr. 16, 2013, 5 pages.
"Hall Effect Proximity Sensors Information", Retrieved from <http://www.globalspec.com/learnmore/sensors_transducers_detectors/proximity_presence_sensing/hall_effect_proximity_sensors> on Mar. 21, 2013, Aug. 31, 2012, 3 pages.
"Hall Effect Pushbutton Switches", Retrieved from <http://www.ottoexcellence.com/file.aspx?Fileld=3337> on Mar. 20, 2013, 1 page.
"Hall Effect Sensor—SparkFun Electronics", Retrieved from <https://www.sparkfun.com/products/9312> on Mar. 21, 2013, Jan. 24, 2013, 7 pages.
"Hi-Res "Pen Cap" Pocket Wearable Spy Camera", Retrieved from <https://www.dynaspy.com/hi-res-pen-cap-pocket-spy-camera-4gb-sd-memory> on Apr. 16, 2013, 2013, 3 pages.
"International Search Report and Written Opinion", Application No. PCT/US2013/013648, Apr. 11, 2014, 9 pages.
"Kodak Easyshare LS443 Zoom Digital Camera—User's Guide", Retrieved from <http://resources.kodak.com/support/shtml/en/manuals/urg00024/urg00024c8s1.shtml> on Mar. 20, 2013, 2 pages.
"Memoto Lifelogging Camera", Retrieved from <http://www.kickstarter.com/projects/martinkallstrom/memoto-lifelogging-camera/> on Mar. 13, 2013, Oct. 23, 2012, 24 pages.
"Non-Final Office Action", U.S. Appl. No. 13/863,998, May 30, 2014, 9 pages.
"Non-Final Office Action", U.S. Appl. No. 13/871,905, May 15, 2014, 7 pages.
"'Panasonic V10 Camcorder Black'—Overview", Retrieved from <http://dicksmith.com.au/product/XG1221/?utm_medium=lasoo&utm_campaign=catalogue&utm_source=XG1221> on Mar. 20, 2013, 2013, 3 pages.
"Spy Mini DVR HDMI Camera", Retrieved from <http://www.balajitech.in/spy-camera.html> on Apr. 16, 2013, 28 pages.
"Tap Detection", Retrieved from <http://www.kionix.com/tap-detection> on Mar. 19, 2013, Oct. 5, 2012, 1 page.
"TouchOSC", Retrieved from <http://hexler.net/docs/touchosc-configuration-options> on Mar. 19, 2013, May 26, 2011, 4 Pages.
"User Guide Jawbone Era", Retrieved from <http://content.jawbone.com/static/www/pdf/manuals/era/jawbone-era-manual.pdf> on Mar. 18, 2013, 2010, 16 pages.
"Using Vicon Revue", Retrieved from <https://www.viconrevue.com/faqs/documents/UsingViconRevuev10_final.pdf> on Apr. 30, 2013, 2010, 41 pages.
Boyle "Smartphone Accelerometers Could Be Used to Eavesdrop on Nearby Devices", Retrieved from <http://www.popsci.com/technology/article/2011-10/smartphones-could-become-spyphones-using-accelerometer-keystroke-detection> on Mar. 25, 2013, Oct. 19, 2011, 2 pages.

Chua, "Shock and Mute Pager Applications Using Accelerometers", Freescale Semiconductor, Inc., Rev. 5, Oct. 2006, 8 pages.
Gallagher, "Using Vanishing Points to Correct Camera Rotation in Images", In 2nd Canadian Conference on Computer and Robot Vision, May 9, 2005, 8 pages.
Hodges, et al.,' "SenseCam: A Wearable Camera which Stimulates and Rehabilitates Autobiographical Memory", In Memory, vol. 19, No. 7, Available at <http://research.microsoft.com/en-us/um/cambridge/projects/sensecam/pdf_files/memory.pdf>,Oct. 2011, 18 pages.
Jacobowitz, "Olympus Stylus 1050 SW", Retrieved from <http://www.pcmag.com/article2/0,2817,2333989,00.asp> on Mar. 21, 2013, Nov. 5, 2008, 6 pages.
Kaur, et al.,' "A Combined DWT-DCT approach to perform Video compression base of Frame Redundancy", In Proceedings: International Journal of Advanced Research in Computer Science and Software Engineering, vol. 2, Issue 9, M.M. University, Mullana (Ambala), Haryana, India,Sep. 2012, pp. 325-332.
Liu, et al.,' "uWave: Accelerometer-based Personalized Gesture Recognition and Its Applications", Pervasive and Mobile Computing, vol. 5, Issue 6, Available at <http://www.ruf.rice.edu/~mobile/publications/liu09percom.pdf>,Mar. 9, 2009, pp. 1-9.
Samadani, et al.,' "Representative Image Thumbnails: Automatic and Manual", In Proceeding of Human Vision and Electronic Imaging XIII, Jan. 24, 2008, 13 pages.
Shiratori, et al.,' "Accelerometer-based User Interfaces for the Control of a Physically Simulated Character", Proceedings of the First ACM SIGGRAPH Conference and Exhibition on Computer Graphics and Interactive Techniques in Asia, vol. 27, No. 5, Available at <http://graphics.cs.cmu.edu/projects/wii/SIGGRAPHAsia2008_wii.pdf>,Dec. 10, 2008, 9 pages.
Terbush, "Looxcie 2 Review", Retrieved from <http://www.laptopmag.com/camcorders/looxcie-2.aspx> on Mar. 20, 2013, May 9, 2012, 3 pages.
Thammineni, et al.,' "Dynamic frame-rate selection for live Ibr Video Encoders using trial frames", In Proceedings: IEEE International Conference on Multimedia and Expo, Ittiam Systems (Pvt.) Ltd., Bangalore, India,Jun. 23, 2008, pp. 817-820.
Tomkins, et al.,' "Nikon D3100", Retrieved from <http://www.imaging-resource.com/PRODS/D3100/D3100VIDEO.HTM> on Mar. 14, 2013, Dec. 13, 2010, 10 pages.
Wilt, "Review: Panasonic AG-AC160 and AG-HPX250 1/3" 3-MOS Camcorders", Retrieved from <http://provideocoalition.com/awilt/story/review_panasonic_ag-ac160_and_ag-hpx250_1_3_3-mos_camcorders/P1/> on Mar. 14, 2013, Jan. 23, 2012, 32 pages.
Zhang, "Using Accelerometer in Windows 8* Metro Style App and a Case Study of Tap Detection", Intel Corporation, Available at <http://software.intel.com/sites/default/files/m/d/4/1/d/8/Accelerometer_Case_Study_Win8.pdf>,Jul. 11, 2012, 20 pages.
"Images of Nokia 6555 Mobile Phone", In: "Images of Nokia 6555 Mobile Phone", XP055143661, figures 1, 2, Oct. 1, 2014, 1 page.
"International Search Report and Written Opinion", Application No. PCT/US2014/034065, Oct. 13, 2014, 18 pages.
"Nokia 6555 User Guide", retrieved from https://web.archive.org/web/20101225182824/http://www.fido.ca/cms/pdf/en/userguides/Nokia6555_en.pdf on Oct. 29, 2014, Dec. 25, 2010, pp. 17, 61, 62.
"Notice of Allowance", U.S. Appl. No. 13/863,998, Oct. 31, 2014, 4 pages.
"Supplemental Notice of Allowance", U.S. Appl. No. 13/863,998, Nov. 26, 2014, 2 pages.
Trumbo, "Samsung Flip Foldable", Retrieved from >http://www.concept-phones.comfsamsung/samsung-flip-foldable-phone-features-wrapscreen/, Jan. 9, 2012, 4 pages.
"Final Office Action", U.S. Appl. No. 13/754,719, Jan. 30, 2015, 18 pages.
"Final Office Action", U.S. Appl. No. 13/873,069, Jan. 5, 2015, 20 pages.
"Supplemental Notice of Allowance", U.S. Appl. No. 13/863,998, Feb. 12, 2015, 2 pages.
"Final Office Action", U.S. Appl. No. 13/892,085, May 7, 2015, 34 pages.

(56) References Cited

OTHER PUBLICATIONS

"Looxcie, User Manual for Android, Model LX1", Retrieved from <http://www.looxcie.com/wp-content/uploads/2012/10/LOOXCIE_LX1_UserManual_Android_15.pdf> on May 8, 2015, 2010, 36 pages.
"Non-Final Office Action", U.S. Appl. No. 13/754,719, May 13, 2015, 20 pages.
"Non-Final Office Action", U.S. Appl. No. 13/873,069, May 22, 2015, 20 pages.
"Non-Final Office Action", U.S. Appl. No. 13/908,906, Mar. 12, 2015, 13 pages.
"Second Written Opinion", Application No. PCT/US2014/013648, Jan. 27, 2015, 7 Pages.
"Second Written Opinion", Application No. PCT/US2014/037406, Apr. 16, 2015, 6 Pages.
"Written Opinion", Application No. PCT/US2014/022896, Feb. 12, 2015, 9 pages.
"International Preliminary Report on Patentability", Application No. PCT/US2014/034065, Jun. 29, 2015, 10 pages.
"International Search Report and Written Opinion", Application No. PCT/US2015/031654, Sep. 14, 2015, 10 pages.
"International Preliminary Report on Patentability", Application No. PCT/US2014/037406, Jul. 28, 2015, 12 pages.
"International Search Report and Written Opinion", Application No. PCT/US2015/031652, Sep. 3, 2015, 9 Pages.
"International Search Report and Written Opinion", Application No. PCT/US2015/031653, Sep. 7, 2015, 9 Pages.
"Final Office Action", U.S. Appl. No. 13/754,719, Nov. 12, 2015, 19 pages.
"Final Office Action", U.S. Appl. No. 13/908,906, Oct. 8, 2015, 11 pages.
"International Preliminary Report on Patentability", Application No. PCT/US2014/040110, Sep. 9, 2015, 10 pages.
"Non-Final Office Action", U.S. Appl. No. 14/285,387, Oct. 30, 2015, 12 pages.
"Notice of Allowance", U.S. Appl. No. 13/873,069, Oct. 14, 2015, 7 pages.
"Restriction Requirement", U.S. Appl. No. 14/285,483, Nov. 5, 2015, 6 pages.
"Final Office Action", U.S. Appl. No. 14/285,387, Mar. 30, 2016, 14 pages.
"Non-Final Office Action", U.S. Appl. No. 14/285,483, Mar. 14, 2016, 15 pages.
"Non-Final Office Action", U.S. Appl. No. 14/990,541, Mar. 2, 2016, 18 pages.
"Second Written Opinion", Application No. PCT/US2015/031652, Apr. 26, 2016, 4 pages.
"Second Written Opinion", Application No. PCT/US2015/031653, Apr. 26, 2016, 5 pages.
Non-Final Office Action, U.S. Appl. No. 13/908,906, May 26, 2016, 13 pages.
Final Office Action, U.S. Appl. No. 14/990,541, Jun. 23, 2016, 22 pages.
Second Written Opinion, Application No. PCT/US2015/031654, May 18, 2016, 6 pages.

* cited by examiner

AUTOMATIC INSERTION OF VIDEO INTO A PHOTO STORY

BACKGROUND

Many people like to document events throughout their day by taking pictures and/or video. Challenges continue to arise for manufacturers and others in this technical space to provide users with a robust and desirable experience.

SUMMARY

This Summary is provided to introduce a selection of concepts in a simplified form that are further described below in the Detailed Description. This Summary is not intended to identify key features or essential features of the claimed subject matter.

Various embodiments provide a capture device, e.g., a camera, that is configured to have multiple capture modes including an image capture mode and a video capture mode. The capture device can be set to the image capture mode in which images or photos are periodically, automatically captured. Upon detection of a particular event, such as an audibly detectable event, the capture device automatically triggers the video capture mode and begins to capture video. After a period of time, the capture device can transition back to the image capture mode. Transition to the image capture mode can occur in various ways, e.g., after passage of a period of time, after the audibly detectable event terminates or attenuates, by way of user input and the like. In some embodiments, the capture device can be embodied as a wearable camera that is worn by a user.

In at least some embodiments, the collection of images and video defines a "photo story" that chronicles the user's day with both still images and video.

Various other embodiments enable a capture device to capture at least one high resolution image and generate a low resolution image based on the high resolution image. Some embodiments transfer an associated low resolution image file to a second device prior to transferring the corresponding associated high resolution image file. In some cases, the low resolution image can be analyzed to determine one or more properties associated with the low resolution image. Processing decisions associated with the high resolution image can then be based on the property or properties of the low resolution image.

Various other embodiments enable a processing device to receive at least a first set of images from a capture device. In some cases, the first set of images is a video clip captured using a first frame rate over a first duration of time. In some embodiments, the processing device analyzes the first set of images to determine one or more properties associated with the images. Based upon the determined properties, some embodiments modify and playback the first set of images at a second frame rate over a second duration of time.

BRIEF DESCRIPTION OF THE DRAWINGS

The detailed description references the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
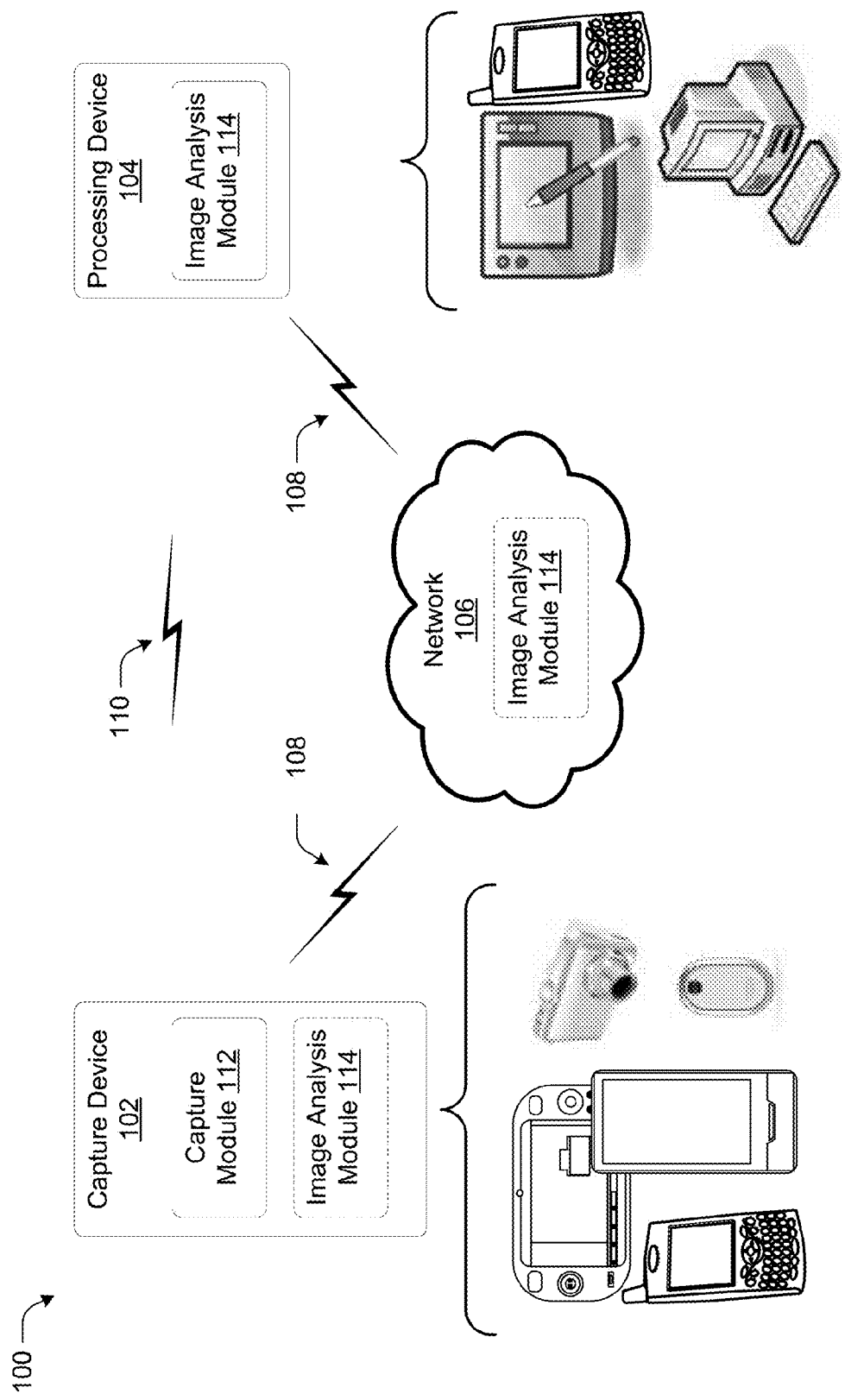
FIG. 1 illustrates an example operating environment in accordance with one or more embodiments.

Various embodiments provide a capture device, e.g., a camera, that is configured to have multiple capture modes including an image capture mode and a video capture mode. The capture device can be set to the image capture mode in which images or photos are periodically, automatically captured. Upon detection of a particular event, such as an audibly detectable event, the capture device automatically triggers the video capture mode and begins to capture video. After a period of time, the capture device can transition back to the image capture mode. Transition to the image capture mode can occur in various ways, e.g., after passage of a period of time, after the audibly detectable event terminates or attenuates, by way of user input and the like. In some embodiments, the capture device can be embodied as a wearable camera that is worn by a user.

In at least some embodiments, the collection of images and video defines a "photo story" that chronicles the user's day with both still images and video.

Various other embodiments enable a capture device to capture at least one high resolution image and generate a low resolution image based on the high resolution image. Among other things, a high resolution image has additional definition and/or pixels not present a corresponding low resolution image. At times, the capture device can connect to a second device in order to transfer the captured images to the second device. Some embodiments transfer an associated low resolution image file to a second device prior to transferring the corresponding associated high resolution image file. In some cases, the low resolution image can be analyzed to determine one or more properties associated with the low resolution image. Processing decisions associated with the high resolution image can then be based on the property or properties of the low resolution image. Such processing decisions can include, by way of example and not limitation, playback decisions, grouping decisions, and the like.

Various other embodiments enable a processing device to receive at least a first set of images from a capture device. In some cases, the first set of images is a video clip captured using a first frame rate over a first duration of time. In some embodiments, the processing device analyzes the first set of images to determine one or more properties associated with the images. Based upon the determined properties, some embodiments modify and playback the first set of images at a second frame rate over a second duration of time.

As noted above, in at least some embodiments the capture device, e.g. the camera, may in some instances be a wearable camera that is worn by the user. The camera can be worn in any suitable location. For example, the camera can be worn on a user's head such as, by way of example and not limitation, a hat-mounted camera, glasses-mounted camera, headband-mounted camera, helmet-mounted camera, and the like. Alternately or additionally, the camera can be worn on locations other than the user's head. For example, the camera can be configured to be mounted on the user's clothing.

Various other embodiments provide a wearable camera that is mountable on a user's clothing. The camera is designed to be unobtrusive and user-friendly insofar as being mounted away from the user's face so as not to interfere with their view. In at least some embodiments, the camera includes a housing and a clip mounted to the housing to enable the camera to be clipped onto the user's clothing. The camera is designed to be lightweight with its weight balanced in a manner that is toward the user when clipped to the user's clothing.

In the discussion that follows, a section entitled "Example Environment" describes an example environment in which the various embodiments can be utilized. Next, a section entitled "Example Capture Device" describes an example capture device, e.g., a camera, in accordance with one or more embodiments. Following this, a section entitled "Duel Encoding" describes an embodiment in which captured image data can be dual encoded in accordance with one or more embodiments. Next, a section entitled "Photo Log" describes an example photo log in accordance with one or more embodiments. Following this, a section entitled "Thumbnail Editing" describes how thumbnails can be used in editing process accordance with one or more embodiments. Next, a section entitled "Automatically Curating Video" describes how video can be curated in accordance with one or more embodiments. Last, a section entitled "Example Device" describes an example device in accordance with one or more embodiments.

Consider now an example environment in which various embodiments can be practiced.

Example Environment

FIG. 1 illustrates an example environment 100 in accordance with one or more embodiments. Environment 100 includes a capture device 102 and processing device 104. Here, capture device 102 is configured to capture images and/or sound. Capture device 102 can be configured in any suitable way, such as, by way of example and not of limitation, a mobile phone, a wearable camera with video and/or still image capture capabilities, a handheld camera, a video camera, a tablet, a gaming device, a desktop Personal Computer (PC), a laptop PC, and so forth. Alternately or additionally, capture device 102 can connect and/or communication with external devices, such as processing device 104.

Processing device 104 connects and receives the images and/or sound captured by capture device 102. Alternately or additionally, processing device 104 can process and/or group the images as described below in more detail. As in the case of capture device 102, processing device 104 can be any suitable type of computing device, such as a tablet, a mobile phone, a desktop PC, a laptop PC, server, and so forth. In some embodiments, processing device 104 has more processing power (e.g. faster Central Processing Unit (CPU), additional CPUs, etc.) and/or more memory storage not included in capture device 102, such that capture device 102 can transfer images to processing device 104 for further analysis and/or processing. In other embodiments, processing device 104 and capture device 102 have equivalent processing resources, or capture device 102 can have more processing resources than processing device 104. At times, processing device 104 can request a transfer of images from capture device 102, while in other cases capture device 102 can push the images to processing device 104. Upon receiving at least part of the images, processing device 104 processes the images for further analysis, as further described below.

Environment 100 also includes network 106. Network 106 represents any suitable type of network through which capture device 102 and processing device 104 can connect, such as a wireless cellular network, wireless internet access (Wi-Fi), and so forth. While not illustrated, network 106 can include additional processing entities, such as servers, wireless access points, cellular base stations, and so forth. For simplicity's sake, these additional entities that can be associated with data transfer between computing devices are generally referred to as network 106. In some embodiments, capture device 102 and processing device 104 connect with each other through network 106, illustrated here by way of connectivity link 108. However, it is to be appreciated and understood that network 106 can be optional.

In some embodiments, capture device 102 and processing device 104 connect with one another outside of network 106, such as through connectivity link 110. Here, connectivity link 110 represents more direct connections between the devices, such as through a Bluetooth connection and/or a hardwire connection (using the associated protocols). Thus, in some embodiments, capture device 102 and/or processing device 104 connect with one another using more direct connections than those described in connection with network 106.

Figure 3:
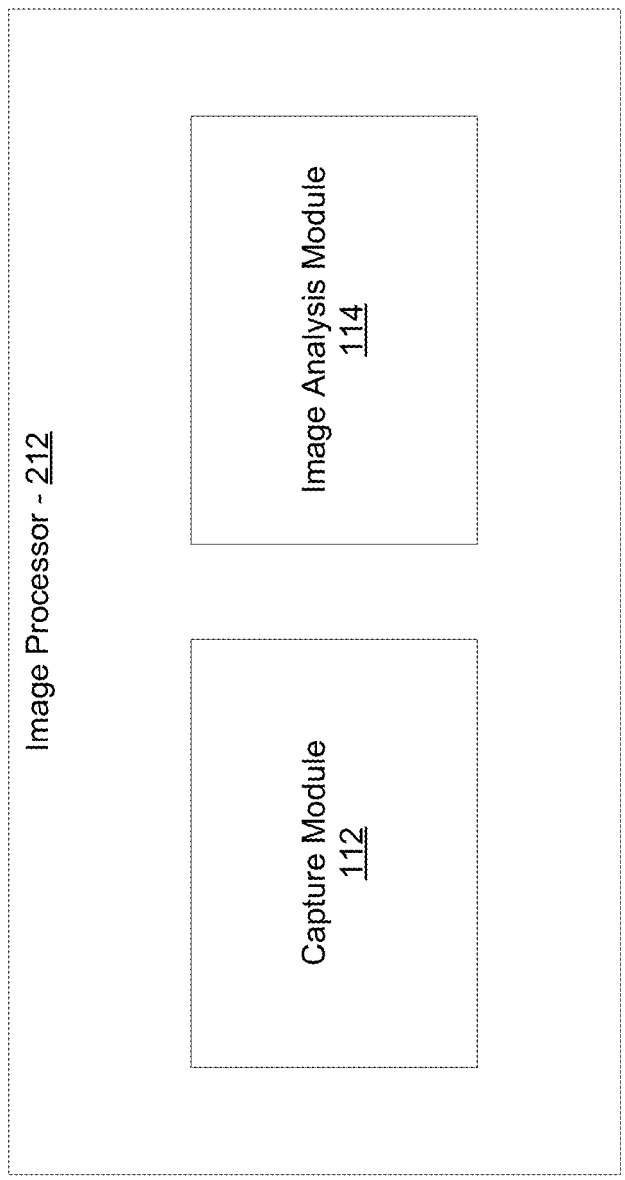
FIG. 3 illustrates an example image processor in accordance with one or more embodiments.

Among other things, capture device 102 includes capture module 112 and an image analysis module 114 (FIG. 3) which may be optional.

Capture module 112 represents an ability to capture images and/or video in a consumable format. This can include any suitable type of format, such as, by way of example, and not of limitation, Joint Photographic Experts Group (JPEG), JPEG 2000, Exchangeable image file format (Exif), Tagged Image File Format (TIFF), RAW, Graphics Interchange Format (GIF), Windows bitmap (BMP), Portable Network Graphics (PNG), portable pixmap (PMM), portable graymap (PGM), portable bitmap (PBM), portable arbitrary format (PAM), High-dynamic-range imaging (HDR), Radiance HDR (RGBE), and so forth. In some embodiments, capture module 112 captures an image, stores a high resolution version of the image, and generates a lower resolution version of the image, such as a thumbnail for purposes which will become evident below.

In various embodiments, the capture module 112 enables the capture device to have multiple capture modes including an image capture mode and a video capture mode. The capture device can be set to the image capture mode in which images or photos are periodically, automatically captured. Upon detection of a particular event, such as an audibly detectable event, the capture device automatically triggers the video capture mode and begins to capture video. After a period of time, the capture device can transition back to the image capture mode. Transition to the image capture mode can occur in various ways, e.g., after passage of a period of time, after the audibly detectable event terminates or attenuates, by way of user input and the like. In some embodiments, the capture device can be embodied as a wearable camera that is worn by a user.

In at least some embodiments, the collection of images and video defines a "photo story" that chronicles the user's day with both still images and video.

As noted above, environment 100 also includes image analysis module 114 which may, but need not necessarily, have part of its functionality distributed across various devices within the environment. In this example, image analysis module 114 is included on processing device 104 (indicated here through the use of a solid line). Alternately or additionally, image analysis module 114, or portions of the processing performed by the module, can be included on capture device 102, and/or on one or more components of network 106, as through a so-called "cloud service". It is to be appreciated, however, that these various placements are optional (indicated through the use of a dashed line).

Image analysis module 114 can include various different types of functionality. Among other things, image analysis module 114 can analyze one or more images to determine properties associated with the image(s), as further described below. For example, in some embodiments, image analysis module 114 can analyze a low resolution image (such as a thumbnail) to determine properties, such as color group features, image quality (blurry versus focused), content, differences in content, and so forth. In turn, processing device 104 can make decisions about the corresponding high resolution image based upon the properties determined from the associated low resolution image. Alternately or additionally, image analysis module 114 can determine properties by analyzing the high resolution image instead of the low resolution image. In some cases, image analysis module 114 can analyze video to determine playback features. For example, image analysis module 114 can analyze video images captured using one or more capture rate(s) over a first period of time, and determine what modifications, if any, to make to the video images in order to play the video images out at playback rate(s) over a second period of time, as further described below.

Various embodiments described above and below can be implemented utilizing a computer-readable storage medium that includes instructions that enable a processing unit to implement one or more aspects of the disclosed methods as well as a system configured to implement one or more aspects of the disclosed methods. By "computer-readable storage medium" is meant all statutory forms of media. Accordingly, non-statutory forms of media such as carrier waves and signals per se are not intended to be covered by the term "computer-readable storage medium".

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

One such configuration of a computer-readable medium is signal bearing medium and thus is configured to transmit the instructions (e.g., as a carrier wave) to the camera device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Figure 2:
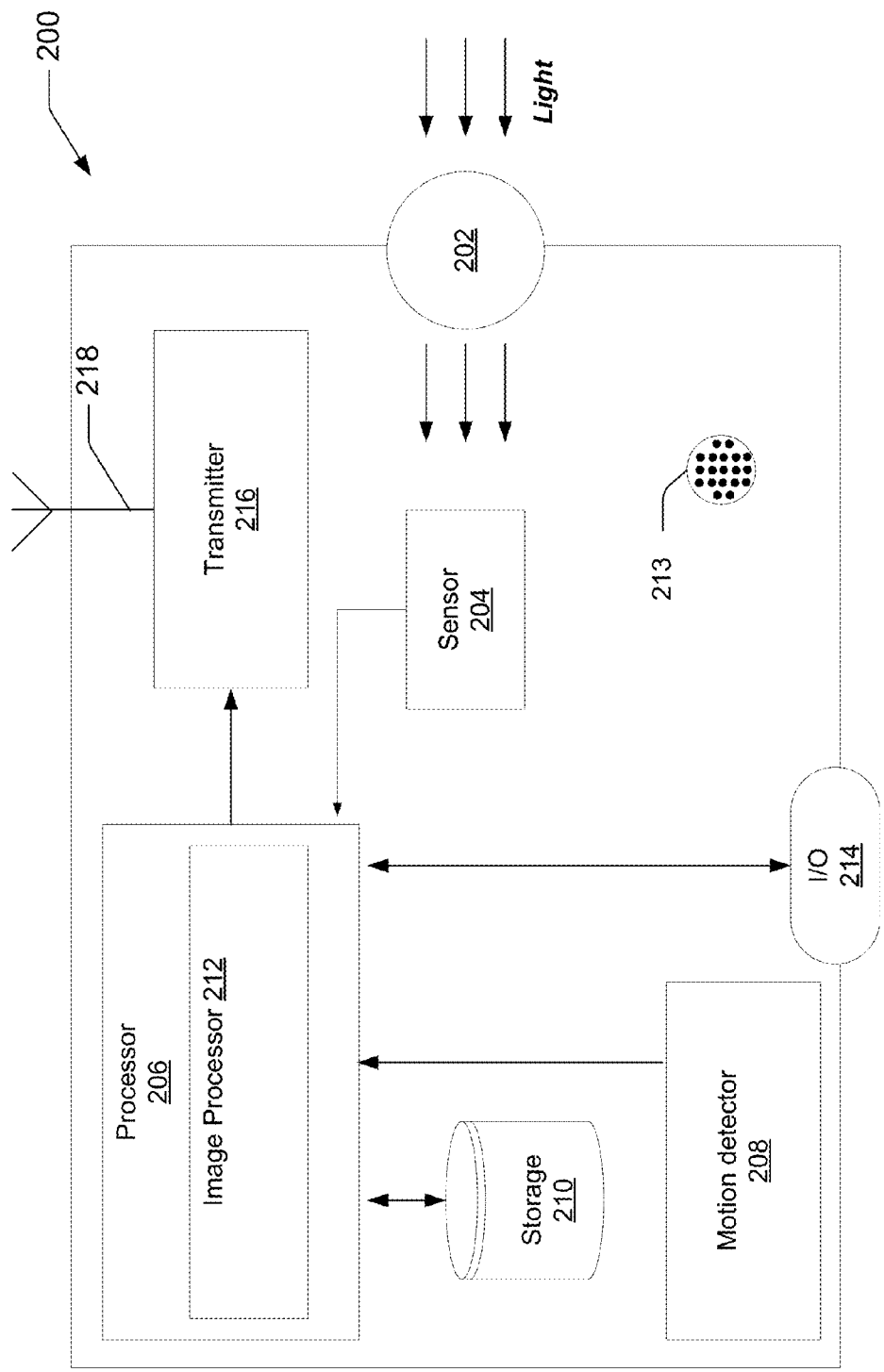
FIG. 2 illustrates an example capture device in accordance with one or more embodiments.

FIG. 2 illustrates a schematic of a capture device (e.g., a camera) 200 in accordance with one or more embodiments. The capture device 200 includes a lens 202 having a focal length that is suitable for covering a scene to be pictured. In one embodiment, a mechanical device may be included with the lens 202 to enable auto or manual focusing of the lens. In another embodiment, the capture device 200 may be a fixed focus device in which no mechanical assembly is included to move the lens 202. A sensor 204 having a sensing surface (not shown) is also included to convert an image formed by the incoming light on the sensing surface of the sensor 204 into a digital format. The sensor 204 may include a charge-coupled device (CCD) or complementary metal oxide semiconductor (CMOS) image sensor for scanning the incoming light and creating a digital picture. Other technologies or devices may be used so long as the used device is capable of converting an image formed by the incoming light on a sensing surface into the digital form. Typically, these image detection devices determine the effects of light on tiny light sensitive devices and record the changes in a digital format.

It should be appreciated that the capture device 200 may include other components such as a battery or power source and other processor components that are required for a processor to operate. However, to avoid obfuscating the teachings, these well-known components are being omitted. In one embodiment, the capture device 200 does not include a view finder or a preview display. In other embodiments, however, a preview display may be provided. The techniques described herein can be used in any type of camera, and are particularly effective in small, highly portable cameras, such as those implemented in mobile telephones and other portable user equipment. Thus, in one embodiment, the capture device 200 includes hardware or software for making and receiving phone calls. Alternately, the capture device 200 can be a dedicated, stand-alone camera.

In at least some embodiments, the capture device 200 further includes a motion detector 208 that can include an accelerometer and, in some embodiments, a gyroscope. The accelerometer is used for determining the direction of gravity and acceleration in any direction. The gyroscope may also be used either in addition to the accelerometer or instead of the accelerometer. The gyroscope can provide information about how the rotational angle of the capture device 200 changes over time. Any other type of sensor may be used to detect the camera's motion. Using the rotational angle, an angle of rotation of the capture device 200 may be calculated, if the capture device 200 is rotated. In at least some embodiments, input can be provided to the camera in the form of one or more taps which have an associated motion profile, as sensed by the accelerometer. The tap or taps can be mapped to camera functionality to activate the functionality. Any suitable type of functionality can be mapped to the tap or taps.

In at least some embodiments, different combinations of taps can be mapped to different camera functionality. Further, in at least some embodiments, the camera includes a microphone 213 which detects sound around the camera. The microphone can be used to sense a noise profile associated with the tap or taps that are received by the camera. The noise profile can be used, together with the motion profile, to confirm the input as a tap input. This can help to disambiguate various other types of input that might be received by the camera, as noted above and below. The microphone can also be used to sense other noise profiles or other noises around the phone and responsive to sensing such noise, implement various functionality as described below.

Further included is an input/output (I/O) port 214 for connecting the capture device 200 to an external device, including a general purpose computer. The I/O port 114 may be used for enabling the external device to configure the capture device 200 or to upload/download data. In one embodiment, the I/O port 214 may also be used for streaming video or pictures from the capture device 200 to the external device. In one embodiment, the I/O port may also be used for powering the capture device 200 or charging a rechargeable battery (not shown) in the capture device 200.

The capture device 200 may also include an antenna 218 that is coupled to a transmitter/receiver (Tx/Rx) module 216. The Tx/Rx module 216 is coupled to a processor 206. The antenna 218 may be fully or partly exposed outside the body of the capture device 200. However, in another embodiment, the antenna 218 may be fully encapsulated within the body of the capture device 200. The Tx/Rx module 216 may be configured for Wi-Fi transmission/reception, Bluetooth transmission/reception or both. In another embodiment, the Tx/Rx module 216 may be configured to use a proprietary protocol for transmission/reception of the radio signals. In yet another embodiment, any radio transmission or data transmission standard may be used so long as the used standard is capable of transmitting/receiving digital data and control signals. In one embodiment, the Tx/Rx module 216 is a low power module with a transmission range of less than ten feet. In another embodiment, the Tx/Rx module 216 is a low power module with a transmission range of less than five feet. In other embodiments, the transmission range may be configurable using control signals received by the capture device 200 either via the I/O port 214 or via the antenna 218.

The capture device 200 further includes a processor 206. The processor 206 is coupled to the sensor 204 and the motion detector 208. The processor 206 may also be coupled to storage 210, which, in one embodiment, is external to the processor 206. The storage 210 may be used for storing programming instructions for controlling and operating other components of the capture device 200. The storage 210 may also be used for storing captured media (e.g., pictures and/or videos). In another embodiment, the storage 210 may be a part of the processor 206 itself.

In one embodiment, the processor 206 may include an image processor 212 which can include a capture module 112 and an image analysis module 114 as described above. The image processor 212 may be a hardware component or may also be a software module that is executed by the processor 206. It may be noted that the processor 206 and/or the image processor 212 may reside in different chips. For example, multiple chips may be used to implement the processor 206. In one example, the image processor 212 may be a Digital Signal Processor (DSP). The image processor can be configured as a processing module, that is a computer program executable by a processor. In at least some embodiments, the processor 212 is used to process a raw image received from the sensor 204 based, at least in part, on the input received from the motion detector 208. Other components such as Image Signal Processor (ISP) may be used for image processing. The image processor 212 can have separate modules that are configured to perform or otherwise affect image capture and perform image analysis functionality described above and below. An example image processor 212 is described in more detail below in FIG. 3 and includes capture module 112 an image analysis module 114.

In one embodiment, the storage 210 is configured to store both raw (unmodified image) and the corresponding modified image. In one or more embodiments, the storage 210 can include a memory buffer, such as a flash memory buffer, that can be used to facilitate capturing image data.

A processor buffer (not shown) may also be used to store the image data. The pictures can be downloaded to the external device via the I/O port 214 or via the wireless channels using the antenna 218. In one embodiment, both unmodified and modified images are downloaded to the external device when the external device sends a command to download images from the capture device 200. In one embodiment, the capture device 200 may be configured to start capturing a series of images at a selected interval.

In one embodiment, a raw image from the sensor 204 is input to an image processor (such as an ISP) for image processing or blur detection. After image processing is applied to the image outputted by the image processor, the modified image is encoded. The image encoding is typically performed to compress the image data.

In an example embodiment, the capture device 200 may not include the components for processing the image captured by the sensor 204. Instead, the capture device 200 may include programming instructions to transmit the raw image after extracting the image from the sensor 204 to a cloud based processing system or other computing system that is connected to the capture device 200 via the Internet, a local area network, or some other connectivity type such as those described above. In cloud based systems, the cloud based system is configured to receive the raw image and process the image or images as described above and below. The encoded image is then either stored in a selected cloud based storage or the image is sent back to the capture device 200 or to any other device according to a user configuration. The use of a cloud based image processing system can reduce a need for incorporating several image processing components in each camera device, thus making a camera device lighter, more energy efficient and cheaper.

In another example embodiment, instead of a cloud based image processing, the capture device 200 may send either a raw image or the image processed through an image processor to another device, e.g., a mobile phone or a computer. The image may be transmitted to the mobile phone (or a computer) for further processing via Wi-Fi, Bluetooth or any other type of networking protocol that is suitable for transmitting digital data from one device to another device. After the mobile device receives the image or images, according to one or more embodiments described, the produced image may be saved to local storage on the device, transferred for storage in a cloud based storage system, or transmitted to another device, according to user or system configurations.

In one embodiment, the native image processing system in the capture device 200 may produce images and/or videos in a non-standard format. For example, a 1200×1500 pixel image may be produced. This may be done by cropping, scaling, or using an image sensor with a non-standard resolution. Since methods for transforming images in a selected standard resolution are well-known, there will be no further discussion on this topic.

As noted above, capture device 200 can assume any suitable form of camera, e.g., a non-wearable or a wearable camera. The wearable camera can be worn in any suitable location relative to a user. For example, the camera can be worn on a user's head such as, by a way of example and not limitation, a hat-mounted camera, glasses-mounted camera, headband-mounted camera, helmet-mounted camera, and the like. Alternately or additionally, the camera can be worn on locations other than the user's head. For example, the camera can be configured to be mounted on the user's clothing or other items carried by a user, such as a backpack, purse, briefcase, and the like.

In the example provided just below, a wearable camera is described in the context of a camera that is mountable on the user's clothing. It is to be appreciated and understood, however, that other types of non-clothing mountable, wearable cameras can be utilized without departing from the spirit and scope of the claimed subject matter.

Having described an example operating environment in accordance with one or more embodiments, consider now a discussion of an example capture device in accordance with one or more embodiments.

Example Capture Device

Figure 4:
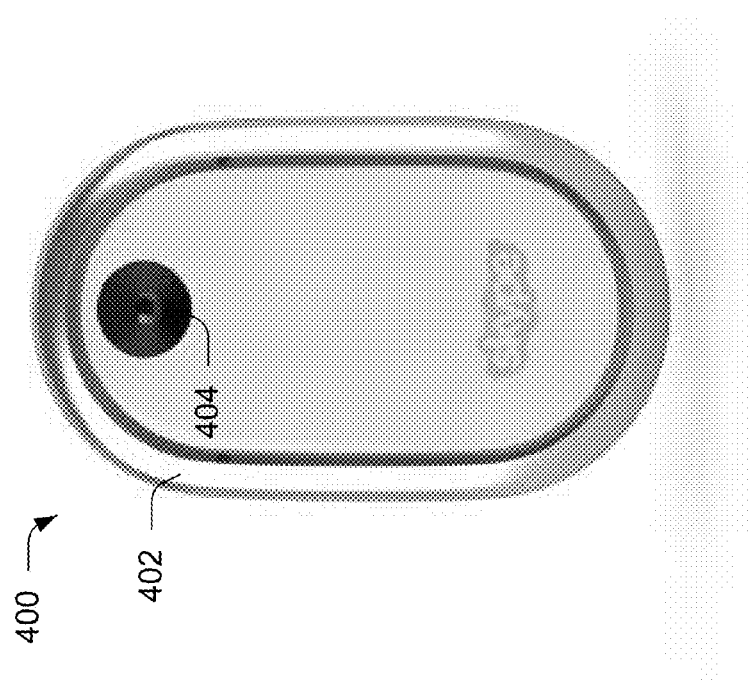
FIG. 4 illustrates a front elevational view of an example capture device in accordance with one or more embodiments.
Figure 5:
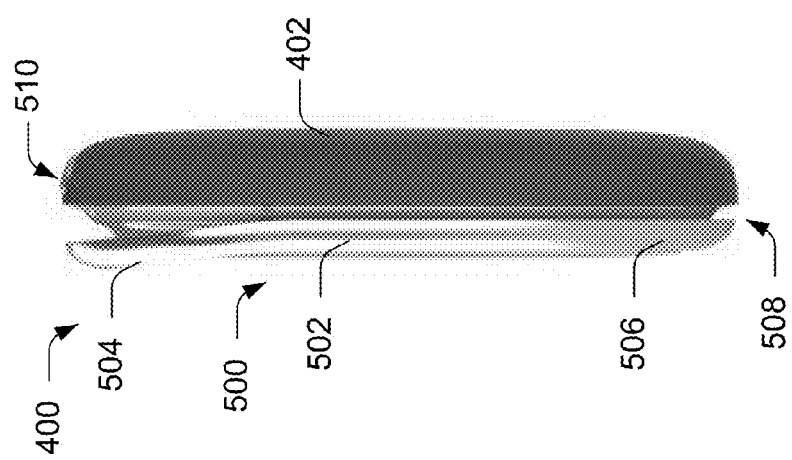
FIG. 5 illustrates a side elevational view of an example capture device in accordance with one or more embodiments.

Moving on, FIG. 4 illustrates an example capture device 400 in a front elevational view, while FIG. 5 illustrates the capture device 400 in a side elevational view.

The capture device 400 includes a housing 402 that contains the components described in FIG. 2. Also illustrated is a camera lens 404 (FIG. 4) and a fastening device 500 (FIG. 5) in the form of a clip that operates in a manner that is similar to a clothespin. Specifically, the fastening device 500 includes a prong 502 with a body having a thumb-engageable portion 504. The body extends along an axis away from the thumb-engageable portion 504 toward a distal terminus 506. A spring mechanism, formed by the body or separate from and internal relative to the body, enables prong 502 to be opened responsive to pressure being applied to the thumb-engageable portion 504. When opened, a piece of clothing can be inserted into area 508. When the thumb-engageable portion 504 is released, the clothing is clamped in place by the prong 502 thereby securely mounting the camera device on a piece of clothing. For example, the camera device can be mounted, as described above, on a necktie, blouse, shirt, pocket, and the like.

In addition, capture device 400 can include a number of input buttons shown generally at 510. The input buttons can include, by way of example and not limitation, an input button to take a still picture and an input button to initiate a video capture mode. It is to be appreciated and understood that the various input buttons can be located anywhere on the capture device 400.

It may be noted that even though the capture device 400 is shown to have a particular shape, the capture device 400 can be manufactured in any shape and size suitable and sufficient to accommodate the above described components of the capture device 400. The housing 402 of the capture device may be made of a metal molding, a synthetic material molding or a combination thereof. In other embodiments, any suitable type of material may be used to provide a durable and strong outer shell for typical portable device use.

In addition, the fastening device 500 can comprise any suitable type of fastening device. For example, the fastening device may be a simple slip-on clip, a crocodile clip, a hook, a Velcro or a magnet or a piece of metal to receive a magnet. The capture device 300 may be affixed permanently or semi-permanently to another object using the fastening device 500.

Having considered an example capture device in accordance with one or more embodiments, consider now a discussion of a dual encoding process.

Dual Encoding

In one or more embodiments, the capture device's processor 206 (FIG. 2) is configured to encode image data at different levels of resolution. For example, the capture device can encode image data at a low level of resolution and at a high level of resolution as well. Any suitable levels of resolution can be utilized. In at least some embodiments, the low level of resolution is Quarter-VGA (e.g., 320×240) and the high level of resolution is 720p (e.g., 1280×720).

Encoding image data at different resolutions levels can enhance the user's experience insofar as giving the user various options to transfer the saved image data. For example, at lower resolution levels, the captured image data can be streamed to a device such as a smart phone. Alternately or additionally, at higher resolution levels, when the user has Wi-Fi accessibility, they can transfer the image data to a network device such as a laptop or desktop computer. The lower and higher resolution levels can also enable additional functionality described below.

Having considered a dual encoding scenario, consider now aspects of a photo log that can be constructed using the principles described above.

Photo Log

Photo log refers to a feature that enables a user to log their day in still photos at intervals of their own choosing. So, for example, if the user wishes to photo log their day at every 3 minutes, they can provide input to the camera device so that every 3 minutes the camera automatically takes a still photo and saves it. At the end of the day, the user will have documented their day with a number of different still photos.

In at least some embodiments, the photo log feature can be used in connection with multiple capture modes including an image capture mode and a video capture mode. The capture device can be set to the image capture mode in which images or photos are periodically, automatically captured, as described above. Upon detection of a particular event, such as an audibly detectable event, the capture device automatically triggers the video capture mode and begins to capture video. The audibly detectable event can be detected in any suitable way. For example, the capture device can have one or more sound profiles stored in memory. The profiles can comprise any suitable type of profile such as, by way of example and not limitation, profiles associated with laughter, clapping, music, abrupt sounds and the like. As the capture device's microphone captures sound in the ambient environment, the sound can be digitized and compared to the profiles stored in memory. If a profile match or fuzzy match is found, the camera automatically triggers the video capture mode and begins to capture video. Alternately or additionally, a threshold-based approach can be utilized to trigger the video capture mode. For example, a sound threshold or thresholds can be defined and, if the ambient sound as captured by the capture device's microphone exceeds a threshold, the video capture mode can be triggered. It is to be appreciated and understood that other events can be used to trigger the video capture mode. For example, a user may provide input to the capture device as through a hard or soft input button After a period of time, the capture device can transition back to the image capture mode. Transition to the image capture mode can occur in various ways, e.g., after passage of a period of time, after the audibly detectable event terminates or attenuates in a manner in which it is no longer detected, by way of user input, and the like. In this manner, video can be used to capture richer content associated with a sound-detected event than static images. In addition, by limiting the video capture mode to a defined period of time, battery power as well as associated storage space is conserved.

Figure 6:
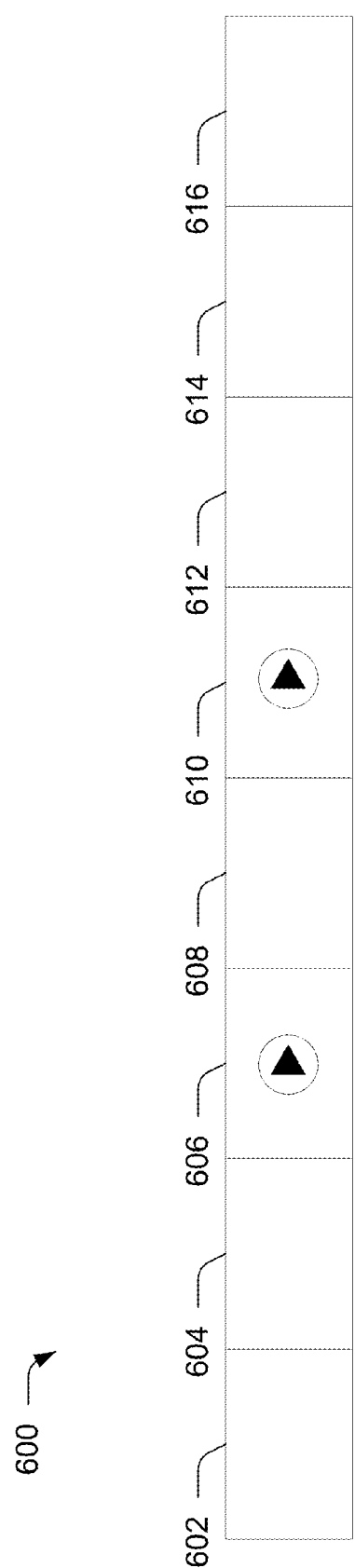
FIG. 6 illustrates a representation of a portion of a photo story in accordance with one or more embodiments

In at least some embodiments, the collection of images and video defines a "photo story" that chronicles the user's day with both still images and video. As an example, consider FIG. 6 which illustrates a representation of a portion of a photo story generally at 600. In this particular example, photo story 600 includes a number of static images 602, 604, 608, 612, 614, and 616. Notice also that the photo story includes video 606 and 610. In this particular example, the video 606, 610 is inserted into the photo story in chronological order with respect to the time that it was captured. Thus, in this particular example, static image 602 was captured before static image 604; static image 604 was captured before video 606; video 606 was captured before static image 608, and so on. In this manner, the static images and video are provided in a presentable form in the context of a particular "story" that has been documented.

Grouping the static images and video in chronological form is but one way in which captured content can be grouped. The captured content, both static images and video, can be grouped in other ways without departing from the spirit and scope of the claimed subject matter. For example, video clips may be analyzed to ascertain characteristics or properties associated with the video. Based on these characteristics or properties, the video clips may be grouped with other video clips that share like characteristics or properties. For example, some video clips may have a predominant color such as green or blue. These clips may be grouped together, while clips having a predominant color of white or pink may be separately grouped. Similarly, video clips that might be associated with laughter may be grouped together while video clips associated music may be separately grouped. Moreover, these grouping techniques can be applied to both static images and video clips. For example, static images and video clips that are found to share a common characteristic or property may be grouped together in their own collection.

As noted above, the processing or portions thereof described above and below can be performed on a capture device, on a computing device to which images and video have been transferred from a capture device, and/or by a cloud-based service either wholly or in a distributed fashion.

Figure 7:
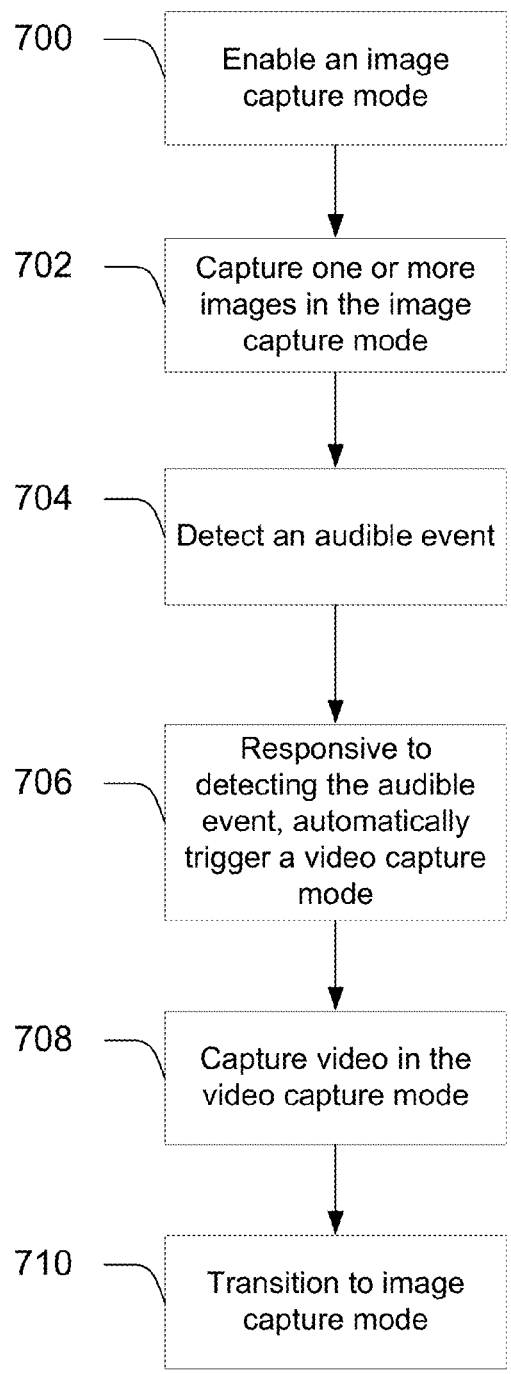
FIG. 7 is a flow diagram that describes steps in a method in accordance with one or more embodiments.

FIG. 7 is a flow diagram that describes steps in a method in accordance with one or more embodiments. The method can be implemented in any suitable hardware, software, firmware, or combination thereof. In at least some embodiments, the method can be implemented by a suitably-configured capture device.

Step 700 enables an image capture mode in a capture device. This step can be performed in any suitable way. For example, in at least some embodiments a user can activate the camera and select an image capture mode in which images are periodically and automatically captured. Step 702 captures one or more images in the image capture mode. This step can be performed by periodically taking a still image. Step 704 detects an audible event. This step can be performed in any suitable way. For example, in at least some embodiments a profile-based approach can be utilized, as described above. Alternately or additionally, in other embodiments a sound threshold-based approach can be utilized. Responsive to detecting the audible event, step 706 automatically triggers a video capture mode. Step 708 captures video in the video capture mode and step 710 transitions to the image capture mode. Transitioning to the image capture mode can be performed in any suitable way. For example, in at least some embodiments transitioning back to the image capture mode can be performed after passage of a period of time. Alternately or additionally, transitioning can occur after the audibly detectable event terminates or attenuates in some manner. In still other embodiments, transitioning can occur by way of user input to the capture device.

Figure 8:
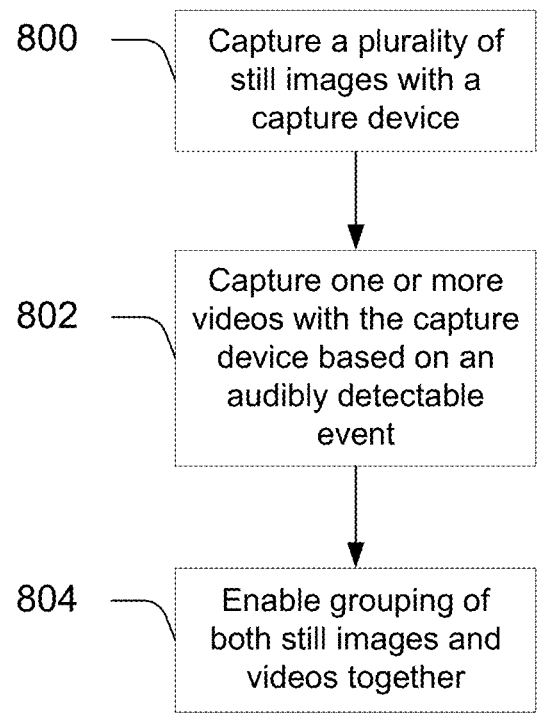
FIG. 8 is a flow diagram that describes steps in a method in accordance with one or more embodiments.

FIG. 8 is a flow diagram that describes steps in a method in accordance with one or more embodiments. The method can be implemented in any suitable hardware, software, firmware, or combination thereof. In at least some embodiments, the method or aspects of the method can be implemented by a suitably-configured capture device. In at least some other embodiments, aspects of the method can be implemented by a suitably-configured capture device and another computing device or service such as a computing device or service that receives the images and video from the capture device.

Step 800 captures a plurality of still images with a capture device. In at least some embodiments, this step is performed automatically and the still images are captured automatically at intervals which may or may not be regular intervals. Step 802 captures one or more videos with the capture device based on an audibly detectable event. In one or more embodiments, this step is performed automatically when an audible event is detected by the capture device. Examples of audibly-detectable events and the manner in which such events may be detected are provided above. Step 804 enables grouping of both still images and videos together. This step can be performed in any suitable way. For example, in at least some embodiments the capture device can arrange the still images and video into a "photo story" in which content is arranged in a chronological order. Alternately or additionally, the still images and video can be provided to a computing device or remote service and can be grouped in any suitable fashion using any suitable techniques. Examples of various groupings are provided above. Further, examples of suitable techniques to group content are provided below.

Having considered embodiments that utilize multiple capture modes, consider now a discussion of embodiments pertaining to thumbnail editing.

Thumbnail Editing

Computing devices often establish connections with one another in order to transfer data between the devices. One such example includes a capture device that connects with another computing device to transfer captured images and/or video. Depending upon the bandwidth of the connection between the capture device and the computing device, transferring the captured images can occur at a rapid rate, or a slow rate. For instance, a Wi-Fi connection with a large bandwidth typically can transfer a large file quickly, thus making the transfer time appear negligible to the user. On the other hand, a Bluetooth connection typically has a lower bandwidth. Transferring that same large file over the Bluetooth connection make take longer than the Wi-Fi connection, and subsequently be more noticeable to the user. In turn, users can sometimes perceive slower transfer times and performance issues associated with either the transferring device or the receiving device, especially when it impedes the user's access to the file in transfer.

In at least some embodiments, a capture device can generate a low resolution image from a high resolution image. The low resolution image can initially be transferred from the capture device to a second computing device for rapid processing. In some cases, the low resolution image can be analyzed to determine properties based upon its image content. When the high resolution image is transferred to the second computing device, it can be processed based upon the properties determined from the low resolution image file.

Figure 9:
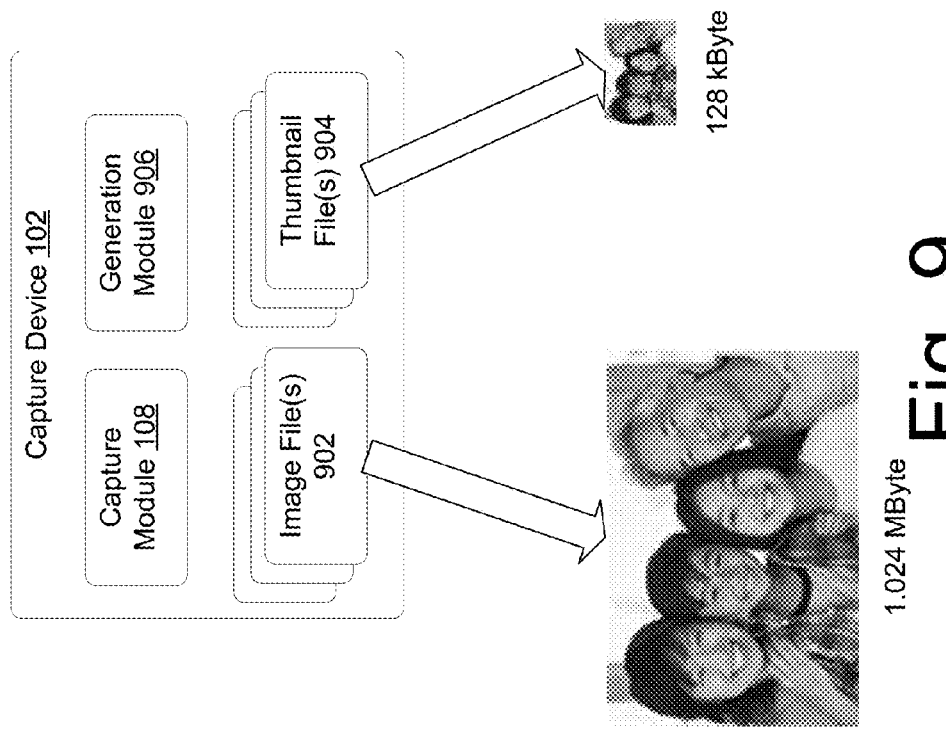
FIG. 9 illustrates an example implementation in accordance with one or more embodiments.

As an example, consider FIG. 9, which illustrates an implementation in accordance with one or more embodiments. Included in FIG. 9 is capture device 102 of FIG. 1. In this particular example, capture device 102 includes image file(s) 902 and thumbnail file(s) 904. Image file 902 can be any suitable type of file, such as a still image, a video image, and so forth. In some cases, image file 902 is a high resolution image captured by capture module 108, and can be stored in any suitable format, examples of which are provided above. Alternately or additionally, the stored format can include information describing properties associated with the captured image, such as raster information, vector information, metadata, date/time stamp information, and so forth. At times, but not necessarily, image file 902 can include a thumbnail image in addition to the high resolution image. For discussion purposes, image file 902 is illustrated as having a data size of 1.024 Megabytes (Mbyte), but it is to be appreciated that image file 902 can be of any data size without departing from the scope of the claimed subject matter.

Thumbnail file 904 is a low resolution image of an associated high resolution image (e.g. image file 902). Here, the lower resolution is indicated with thumbnail file 904 being visually smaller, and having a smaller data size than image file 902 (e.g. 128 kilobytes (kByte)). As in the case of image file 902, the illustrated data size of thumbnail file 904 is merely for discussion purposes, and it is to be appreciated that a thumbnail file can have any suitable data size. These data sizes are used to indicate that, among other things, a low resolution image file is an image file with less image detail than a corresponding high resolution image file. Due to the lesser detail, the resultant data size of a thumbnail image is lower than a corresponding high resolution image file. Subsequently, the transfer time of a low resolution image file can be less than the corresponding high resolution image file. In some embodiments, capture device 102 generates thumbnail file 904 from image file 902, such as through generation module 906.

Generation module 906 generates a thumbnail file from an image file. In the above example, thumbnail file 904 is generated by reducing the visual size of the image file 902. However, it is to be appreciated that any suitable compression and/or reduction algorithm can be utilized to generate a thumbnail image. For instance, when a high resolution image file includes a low resolution thumbnail image of the captured image, generation module 906 can extract the low resolution thumbnail image, and create a new file containing the thumbnail image. In some cases, the compression and/or reduction algorithm is automatically applied by capture device 102, while in other cases it can be manually selected by a user. Further, generating a low resolution image file can be triggered automatically or manually by any suitable event, such as upon capturing a high resolution image, upon identifying a connection between a capture/sending device and the processing/receiving device is established, upon determining the connection between devices has a bandwidth below predefined threshold, upon request from a receiving device, upon receipt of user input through selectable controls, and so forth.

Figure 10:
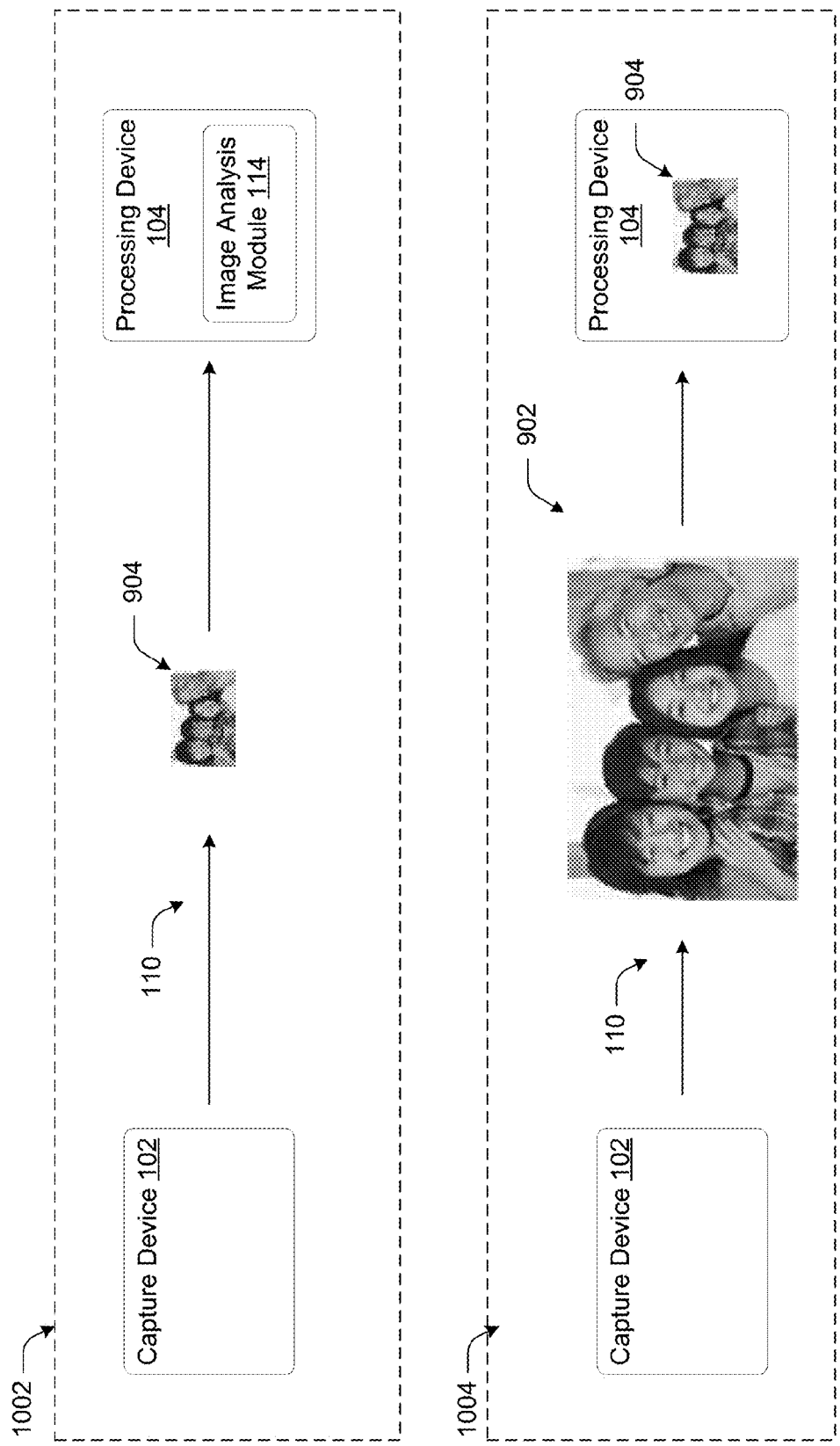
FIG. 10 illustrates an example implementation in accordance with one or more embodiments.

To take advantage of the smaller data size, some embodiments first transfer a low resolution image file to a receiving device prior to transferring the associated high resolution image file. The smaller data size of the low resolution image file allows for a quicker transfer, thus enabling the receiving device to begin processing the content faster, as well as allowing a user quicker access to the content. Consider FIG. 10, which illustrates an example implementation in accordance with one or more embodiments. Here, FIG. 10 captures two separate interactions between capture device 102 and processing device 104 of FIG. 1 at time 1002 and time 1004, respectively.

At time 1002, capture device 102 initially transfers thumbnail file 904 of FIG. 9 to processing device 104 using connectivity link 110. In some embodiments, capture device 102 automatically transfers a low resolution image file (such as thumbnail file 904) based upon a determination that the connectivity bandwidth is below a predetermined threshold. In other embodiments, the low resolution image file is automatically transferred independent of the transfer bandwidth. However, transferring the low resolution image can be initiated in any suitable manner, such as, by way of example and not limitation, automatically upon the connection between devices being established, automatically when the low resolution image is created, manually upon receiving input from a user, and so forth. In some embodiments, a transfer can be manually initiated by a user through selectable control(s) associated with capture device 102 and/or selectable controls associated with processing device 104, and/or processing device 104 sending a transfer request to the capture device for either a low resolution image file or a high resolution image file. Thus, the transfer of thumbnail file 904 can be initiated manually and/or automatically through capture device 102 and/or processing device 104.

Upon receiving thumbnail file 904, processing device 104 begins processing it via image analysis module 114. Any suitable type of processing can occur, such as image content analysis, color palette analysis, property identification, image quality analysis, user input associated with the thumbnail file, facial recognition analysis, date/time stamp identification, and so forth. When the processing device receives multiple image files and/or video files, it can automatically group these files based upon properties determined from associated thumbnail files. For instance, sometimes processing device 104 automatically places transferred image files into a photo story, as described above, based upon these determined properties associated with the images, and/or enables a user to manually place images into the photo story. Since the transfer time of a high resolution image file takes longer than the transfer time of an associated low resolution image file, some embodiments initially transfer the low resolution image file to processing device as a way to gain quicker access to the associated image.

At time 1004, capture device 102 transfers image file 902 to processing device 104. This can occur at any suitable point in time, such as upon determining thumbnail file 904 has been completely transferred, or upon determining capture device 102 and/or processing device 104 are in idle states. In this example, processing device 104 is already displaying the content of thumbnail file 904 to a user prior to the transfer of image file 902. This enables a user to enter commands, such as editing commands, relative to thumbnail file 904 before image file 902 has been received, or even before its transfer has begun. In turn, these commands can be subsequently applied to image file 902. For instance, a user may decide to delete thumbnail file 904. Depending upon the transfer state of image file 902, this can cancel the transfer of image file 902 if it were in progress, send a command to capture device 102 to not send image file 902 if transfer has not started, and/or delete image file 902 from storage on processing device 104 and/or capture device 102. In yet another example, the user may enter a command to place thumbnail file 904 in a particular order in a photo story, such as the beginning, end, or next to another related image. In turn, this command can be applied to image file 902 when it is fully received. Alternately or additionally, processing device 104 can automatically make sorting decisions of image file 902 based upon thumbnail file 904. Thus, processing device 104 can preprocess an image file before it is received by first analyzing an associated thumbnail file. While time 1004 shows image file 902 as being in transfer while processing device 104 analyzes thumbnail file 904, it is to be appreciated that image file 902 can be in any suitable stage of transfer (e.g. unsent to processing device 104, fully received by processing device 104, partially received by processing device 104) during access to thumbnail 904 without departing from the spirit of the claimed subject matter.

Figure 11:
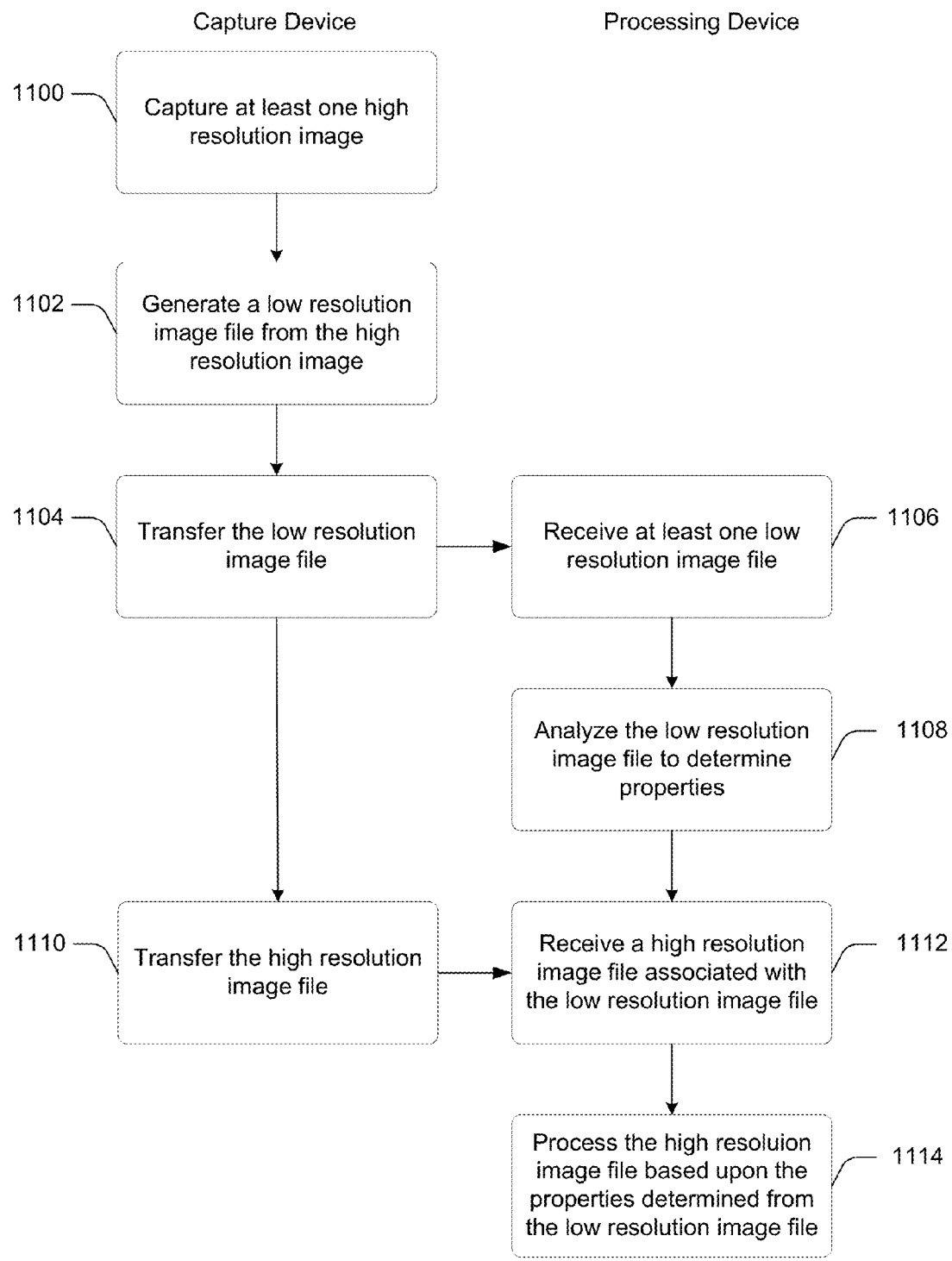
FIG. 11 is a flow diagram that describes steps in a method in accordance with one or more embodiments.

FIG. 11 is a flow diagram that describes steps in a method in accordance with one or more embodiments. The method can be performed in connection with any suitable hardware, software, firmware, or combination thereof. In at least some embodiments, the method is performed by suitably-configured devices, such as capture device 102 and/or processing device 104 of FIG. 1. In this example, the left-hand column entitled "Capture Device" illustrates steps in a method performed by a capture device, while the right-hand column entitled "Processing Device" illustrates steps in the method performed by a processing device. However, it is to be appreciated that these steps could be performed by a single computing device and/or multiple computing devices without departing from the scope of the claimed subject matter.

Step 1100 captures at least one high resolution image. Among other things, a high resolution image includes additional image detail not present in a low resolution image. Any suitable type of image can be captured, such as a still image, a video image, and so forth. In some embodiments, the high resolution image is captured by a wearable camera configured to automatically capture images and/or video over time.

Responsive to capturing the high resolution image, step 1102 generates a low resolution image file from the high resolution image. Some embodiments extract a copy of thumbnail image from a high resolution image file and create a second, separate file to store the copy. Other embodiments generate a low resolution image file by processing the high resolution image using reduction and/or compression algorithms as further described above.

Step 1104 transfers the low resolution image file to another computing device. In some cases, low resolution images are automatically transferred after they are generated. Alternately or additionally, low resolution images can be automatically transferred upon establishing a connection between devices, upon determining the connection has a bandwidth below a predefined threshold, upon determining the connection is of a certain type (i.e. determining the connection is a Bluetooth connection, determining the connection is a Wi-Fi connection, etc.), and so forth. In some cases, transferring low resolution image files can be manually initiated by a user.

Step 1106 receives at least one low resolution image file. This can happen in any suitable manner, such as over a direct connection or through a network connection. Responsive to receiving the low image resolution file, step 1108 analyzes the low resolution image file to determine properties of the image file. Any suitable type of processing and/or analysis can be performed to determine any suitable type of property, examples of which are provided above. In some cases, the processing device automatically processes the low resolution image file upon its receipt. In other cases, the processing device processes the low resolution images based upon manual input such as commands received from a user (i.e. editing commands). Thus, the low resolution image file can be automatically processed to determine properties, or can be manually processed via a user entering commands.

Step 1110 transfers the high resolution image file from the capture device to the processing device. Step 1112 receives a high resolution image file associated with the low resolution image file. Here, steps 1110 and 1112 are illustrated as occurring after step 1108, but it is to be appreciated that these steps can occur in any suitable order relative to step 1108 without departing from the scope of the claimed subject matter. For example, in some embodiments, the high resolution image file can be sent by the capture device and subsequently received by the processing device in parallel to the processing of the low resolution image file.

Responsive to receiving the high resolution image file, step 1114 processes the high resolution file based upon the properties determined from the low resolution file. Alternately or additionally, step 1114 processes the high resolution file based upon input from the user relative to the low resolution image file. For example, as described above, if a user enters an editing command relative to the low resolution image, that command can then be applied to the high resolution image file. While step 1114 is illustrated as occurring after steps 1110 and 1112, it is to be appreciated that, as in the case above, step 1114 can occur before these steps, in between these steps, and/or in lieu of these steps without departing from the scope of the claimed subject matter. For instance, if, as a result of step 1108, a determination is made that the low resolution image file has poor image quality, and a user subsequently deletes the low resolution image file, step 1114 applies this same process to the high resolution image file (e.g. transfer of the high resolution file is terminated and/or deleted from memory). Thus, a low resolution image file can be utilized to enable faster image analysis in a low bandwidth transfer environment by first analyzing the low resolution, and subsequently applying the results to a corresponding high resolution file.

Having considered an example of thumbnail editing, consider now aspects of automatically curating video to fit a display time.

Automatically Curating Video

As discussed above, a capture device can periodically capture images and/or video over time. For example, a capture device such as a wearable camera, can be configured to capture multiple images or videos at various points in a day. There can be different events that trigger capturing the images or videos and typically these multiple images and/or video can be used to chronicle a day's events. While the capture device can perform some initial analysis to trigger image capturing, it may not have sufficient processing power to verify the quality or content of the images post-capture. To remedy this, some embodiments forward the captured images to a processing device that has more processing capabilities for further analysis. At times, the processing device may playback the images at a different frame rate and/or different time duration than an associated capture rate or duration. In some embodiments, the processing device can modify playback of the images based upon the analysis.

Figure 12:
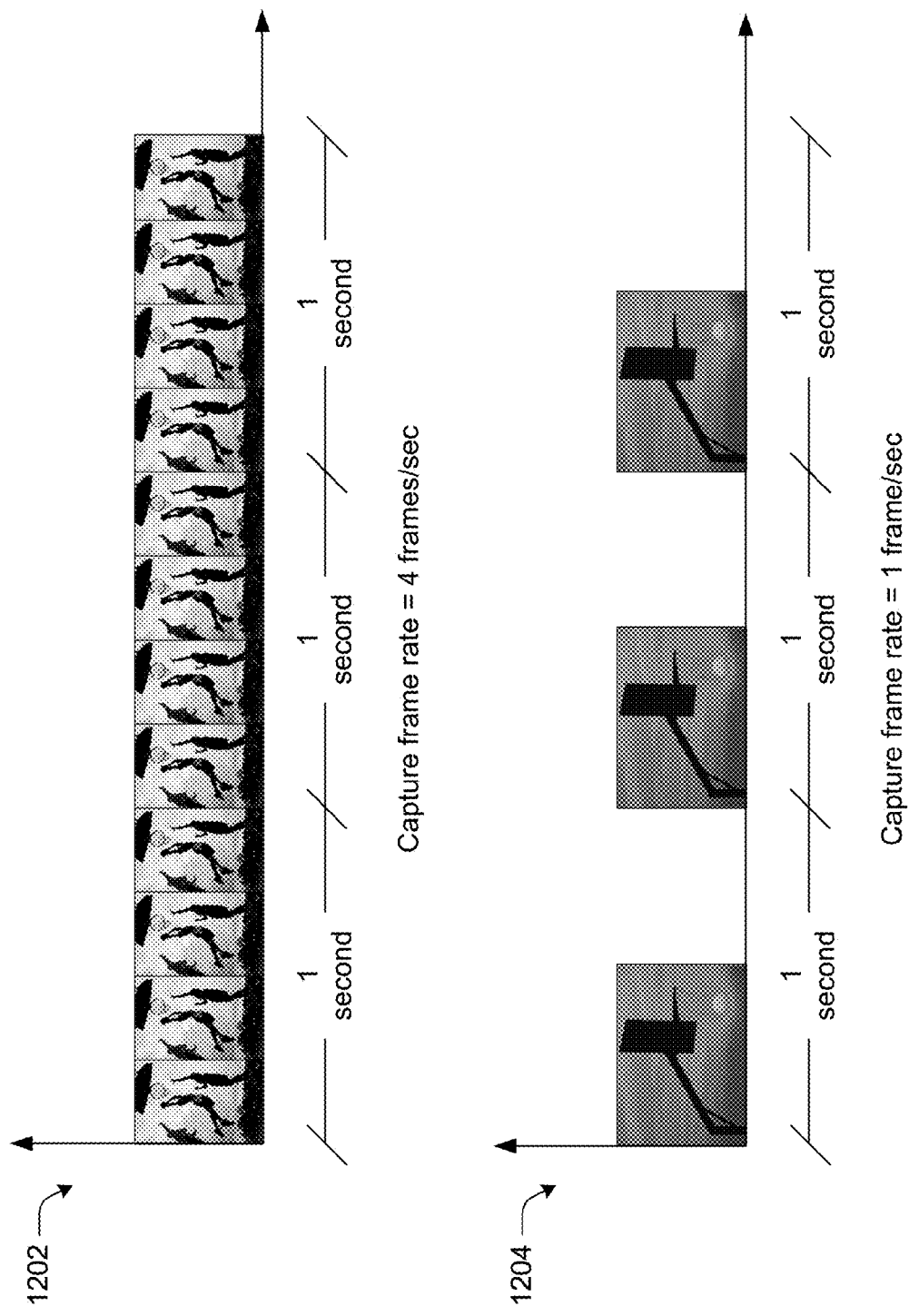
FIG. 12 illustrates an example implementation in accordance with one or more embodiments.

To further illustrate, consider FIG. 12 which includes an example implementation in accordance with one or more embodiments. FIG. 12 includes two separate videos acquired by a capture device that are labeled video 1202 and 1204, respectively. Video 1202 includes a series of images (and accompanying audio) that capture a basketball game in progress. Here, the video lasts for a time duration of 3 seconds, and was captured using a capture frame rate of 4 frames per second. In some embodiments, the capture device can adjust the capture frame rate according to whether the images being captured have rapid movement/changes, or little to no movement/changes. For example, in video 1202, the capture device determines to capture the activity using a capture frame rate of 4 frames per second since a basketball game typically includes movement. Conversely, video 1204 includes a series of images (and accompanying audio) captured at a different point in time when the basketball court is empty. For video 1204, the capture device identifies the lack of activity and uses a coarser capture frame rate of 1 frame per second (again over 3 seconds in time). Thus, the capture device can be configured to not only capture images at different points in time, but additionally be configured to capture images at different capture frame rates and/or different durations of time. It is to be appreciated that the values used in this discussion to describe a capture time duration, as well as a capture frame rate, are merely for discussion purposes, and that any suitable combination of values can be used for time durations and/or frame rates without departing from the scope of the claims subject matter.

Figure 13:
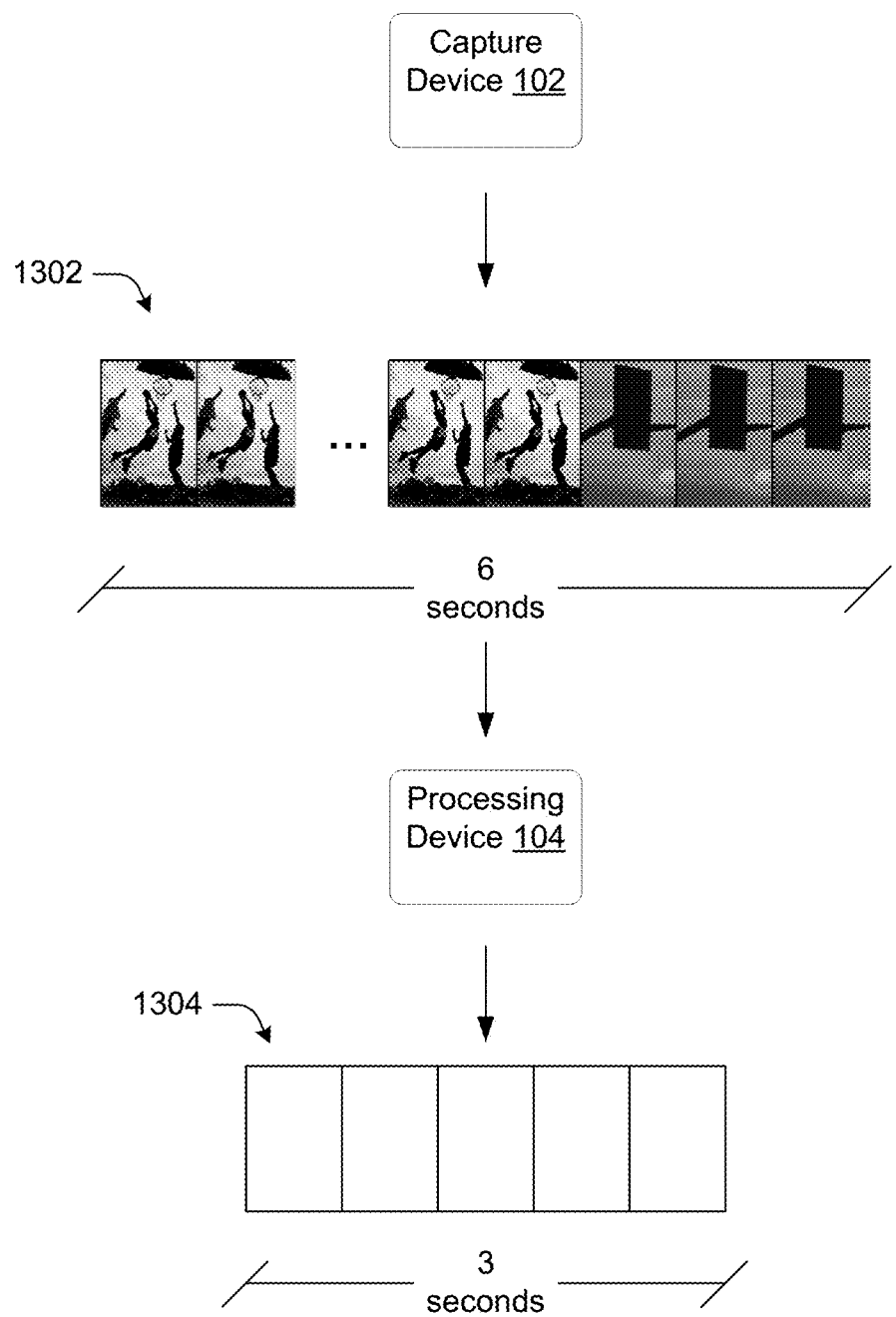
FIG. 13 illustrates an example implementation in accordance with one or more embodiments.

Moving forward, at some arbitrary point in time, the capture device or user thereof may decide to transfer the captured images to a processing device. FIG. 13 illustrates such an example using capture device 102 and processing device 104 of FIG. 1. Here, capture device 102 transfers both videos of FIG. 12 to processing device 104. For the sake of brevity, videos 1202 and 1204 are illustrated as being transferred together as a concatenated video 1302, which has a time duration of 6 seconds. It is to be appreciated that this is merely for discussion purposes, and that images can be transferred between devices independently from one another and/or at different points in time without departing from the scope of the claimed subject matter. Among other things, processing device 104 analyzes received images and/or videos to determine grouping and/or playback orders, as further described above and below. Sometimes the processing device receives content that has different capture parameters than a playback slot that may have predetermined playback parameters. For example, in FIG. 13, playback slot 1304 has a playback time duration parameter of 3 seconds, and is currently in an empty state and/or without content. Upon receiving images from the capture device, processing device determines how to fill playback slot 1304. However, as illustrated here, the capture device has captured and transferred more content to the processing device than what fits into playback slot 1304 when the received content is left unmodified.

In some embodiments, the processing device can receive at least a first set of images captured at a first rate over a first duration of time. This can be seen in the above example, where processing device 104 receives two sets of images captured at two separate capture frame rates: video 1202 which has a capture frame rate of 4 frames per second, and video 1204 which has a capture frame rate of 1 frame per second. Processing device 104 can analyze these sets of images to determine a modified playback of the images, such as by using at least a second frame rate for playback over a second duration of time.

Figure 14:
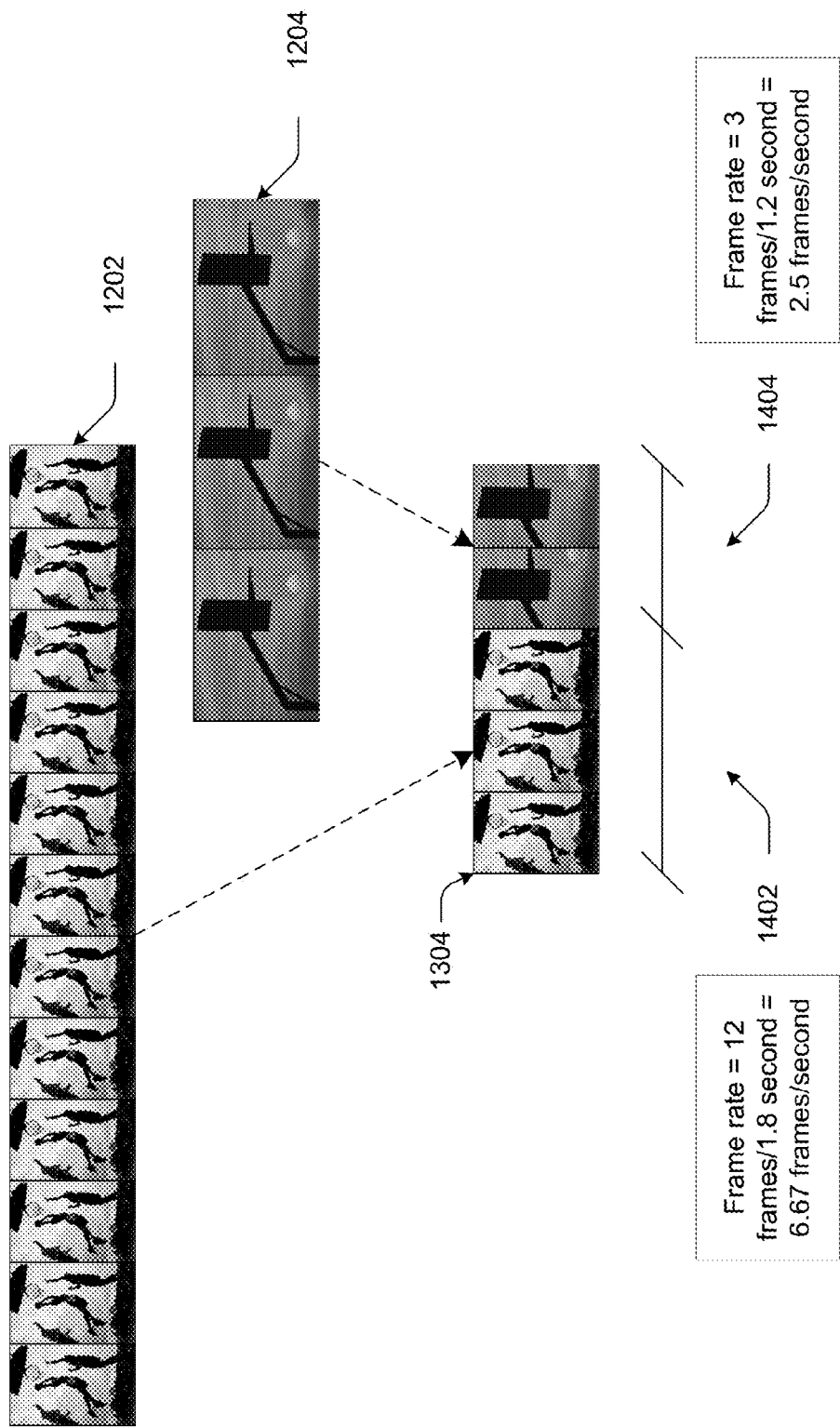
FIG. 14 illustrates an example implementation in accordance with one or more embodiments.

To further illustrate, consider FIG. 14. This example illustrates at least one implementation that can be used by a processing device to modify received images for playback. Here, video 1202 and video 1204 of FIG. 1 are modified to fit the playback time duration set by playback slot 1304. The total duration of playback time of videos 1202 and 1204 when played back at their respective capture frame rates is 6 seconds, which exceeds the playback duration time of playback slot 1304, which is 3 seconds. To compensate for this, processing device modifies the playback rate and time duration at which each respective video is played. Each of these variables can be determined in any suitable manner. For instance, videos can be analyzed to determine which videos contain more image content changes and/or activity. Videos with more activity can, in some cases, be assigned a longer duration of playback time. Here, video 1202 is identified as including more image content changes (e.g. activity) than video 1204. Based upon this analysis, video 1202 is assigned a longer playback time duration than that assigned to video 1204 in order to see the activity better. When inserting a video 1202 into playback slot 1304, it is assigned time duration 1402 (which is 1.8 seconds), yielding a resultant playback frame rate of 6.67 for video 1202. Conversely, video 1204 is assigned time duration 1404 (which is 1.2 seconds), yielding a resultant playback frame rate of 2.5 frames per second. With this particular process, each video plays back the entirety of its associated images in the time duration set by playback video 1304. However, alternate processes can be used to modify and identify what images are selected for playback without departing from the scope of the claimed subject matter, such as, by way of example and not limitation, removing images in a video based upon image quality, alternating images in a video, playing back portions of a video, and so forth. At times, these modifications can be based upon image analysis and/or audio analysis, as further described below.

Typically, the content of captured images varies from image to image. Some captured images can include sharp and/or focused images, others may contain more blurry and/or less focused images, some can include images of people, others can be empty of people, and so forth. In some cases, some captured images can contain "less interesting" content (i.e. images with limited activity and/or images that do not vary from one another) than others that contain "more interesting" content (i.e. images with high activity and/or changes, images with facial captures, etc.). These properties can be utilized by a processing device when making determinations on how to modify received videos and/or images for playback. For example, a processing device can be configured to determine quality metrics and/or proximity metrics, and select images for playback based on these metrics.

Figure 15:
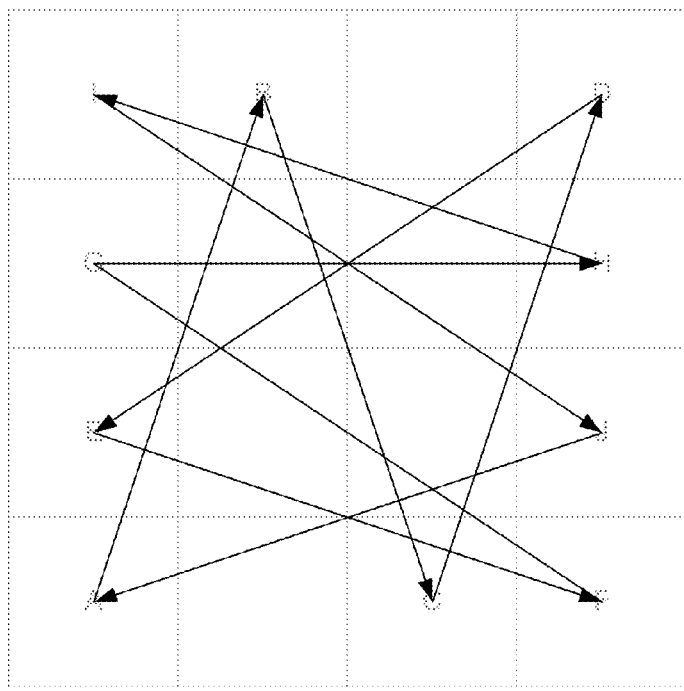
FIG. 15 illustrates an example implementation in accordance with one or more embodiments

Consider FIG. 15, which illustrates an example implementation in accordance with one or more embodiments. This particular example illustrates how metrics can be computed to measure image quality and/or image similarity. Among other things, image quality can be measured by measuring the image's sharpness and/or clarity. Consider image 1502, which represents any suitable type of image, such as a high resolution image, a low resolution image, etc. Assume the image is covered by a 4×4 grid as illustrated. Sharpness of the associated image can be estimated as an average (per pixel step) differential energy over a representative trajectory, as illustrated by image 1504. Each pixel-size step of a trajectory contributes to the metric as square difference in lightness, where lightness can be defined as: (4G+2R+B)/7. Here, "G", "R", and "B" represent normalized RGB (Red Green Blue) space color components. The total energy is post-normalized by trajectory length in pixel-size steps.

Some embodiments process an image to generate proximity metrics. Proximity criteria can include metrics corresponding to local (detail), intermediate (shape), and global (overview) domains, as further described below.

Global Domain: Color Histogram

The global domain metric is a color histogram (hue component) of a Gaussian-blurred image. Other components (saturation and brightness) are much more prone to noise than hue. Blur is applied to minimize deviation caused by grain, ornament/texture details and other sources of color noise and "highlight" consistent, contiguous same-color regions. The distance between two images is a normalized dot product of their color histograms.

Intermediate Domain: "Shape Hash"

For an intermediate domain metric, some embodiments pick random points from the image, such as by using a Monte-Carlo area estimation method. The random points are then analyzed, and decisions are made to retain points with a defined hue, a saturation above a desired saturation threshold, and/or brightness within a desired brightness range (e.g., distinctively colorful points "selection S"). These points can then be clustered utilizing any suitable clustering algorithm, such as "K means", into a small number of clusters. Alternately or additionally, a coarse estimate can then be generated ("cloud match"), where a distance between cluster Ai of image A and cluster Bj of image B is the absolute value of the vector composed of differences in (normalized) X (horizontal) and Y (vertical), cluster center coordinates relative to the image center, average sine and cosine of their members' hue coordinates, cluster sizes relative to count of S, and so forth. In some cases, the total distance between images A and B is the average of all pairwise distances between Ai and Bj for all possible pairs of i and j. In some embodiments a fine estimate is generated. In a fine estimate, and for each cluster, locations of its members are converted into polar coordinates based at the cluster's center. Resulting coordinate pairs can then be ordered by the angle coordinate and a Gaussian blur can be applied to simulate a smooth envelope. The envelope can then be transformed into the frequency domain using a Fourier-transform. Shape similarity (i.e. normalized dot product of the resulting spectra) can be multiplied into the pairwise "cloud match" estimate. If no "clouds" are detected in either of the image, the distance is assumed to be 0.5. If "clouds" are detected in one image but not found in the other, the distance is assumed to be 1.

Feature Point Matching

In some embodiments, feature points and/or interest points (i.e. N best points of interest) can be found using the Hessian-Laplace descriptor. After that, interest point descriptor sets of two images are matched 1-1 using a K-dimensional tree. The number of matching points are then normalized by the geo-mean of the total number of interest points found in each image. The resulting value can be used as a distance estimate.

Geometry Matching

In addition to the feature point metric, some embodiments generate a geometry metric by calculating the Pearson correlation between normalized coordinates of matched interest points. High values of the geometry metric can be used to indicate that not only the details of two images largely match, but also they are located in a similar way relative to each other (ignoring linear transformations, such as rotation, scaling and translation).

Combined Proximity

Each calculated metric can then be used to contribute to the combined proximity metric in the following way:
 1. pre-normalized to the [0 . . . 1] range (0 for exactly similar images, 1 for completely unrelated);
 2. raised to the power of its Importance;
 3. post-normalized to the [Doubt . . . 1] range.

The Doubt weight component is mixed in to avoid taking decisions (i.e. considering two images similar) by a metric knowingly prone to false positives. For instance, the Doubt adjustment for any metric that discards geometry and considers only color should be high (close to 0.5). For a metric that distinctively identifies fine structures, such as faces or texts, the Doubt should be very low. The combined distance is a product of step (3) results of each individual metric.

Thus, some embodiments analyze the content of images to generate one or more metrics and/or properties that quantify and/or describe the content. These metrics can then be used to select and/or modify which images are played back by the processing device, such as by removing at least some images that appear to be duplicates of one another, only selecting images that generate metrics that indicate content of interest, and so forth.

At times, a user may desire to couple images to audio. Some embodiments enable playback of images to be synchronized with audio. For example, a user may have one or more audio tracks of favorite songs that they desire to have images synchronized to. These audio track(s) can be analyzed to determine properties of the music, such as a beat. In turn, playback properties can be based upon the music properties. A beat in music is a frequency, rhythm and/or tempo to which the music is synchronized and/or includes. In some embodiments, playback of a video can be modified based upon a determined beat of the music. Consider a simple case where a selected audio track includes a 100 Hz tone that pulses every 0.25 seconds. Some embodiments analyze the audio track to identify the 0.25 second beat, then generate a playback frame rate for a video based upon the beat. For example, suppose 4 frames per beat is the desired playback rate. Using the above numbers, this becomes:

$$0.25 \text{ second beat intervals} = 4 \text{ beats/second}$$

$$4 \text{ frames per beat} * 4 \text{ beats/second} = 16 \text{ frames/second}$$

which yields a playback frame rate of 16 frames per second. Subsequently, the corresponding video can be modified to playback at this rate. These values are merely for discussion purposes, and it is to be appreciated that any suitable combination of numbers can be used without departing from the scope of the claimed subject matter. Further, while this is described with respect to a video, it is to be appreciated that this can be applied to still images as well. For example, consider photo story 600 of FIG. 6. Photo story 600 includes various still images and video. In some embodiments, the transition between the still images and/or video (i.e. displaying a first still image for a first period of time, then displaying a second still image and/or video for a second period of time, etc.) can be based upon determined properties of the audio track. Using the above example of 0.25 second beat intervals, a transition interval can be generated, such as 3 second transition intervals (0.25×12 beats/transition), 10 second intervals (0.25×40 beats/transition). Alternately or additionally, this can be applied to a video to determine the playback time duration. Thus, in addition to modifying playback of images based upon image content, some embodiments modify playback of images based upon synchronizing the playback to audio.

Having considered various image/video processing techniques, consider now a discussion of an example method in accordance with one or more embodiments.

Figure 16:
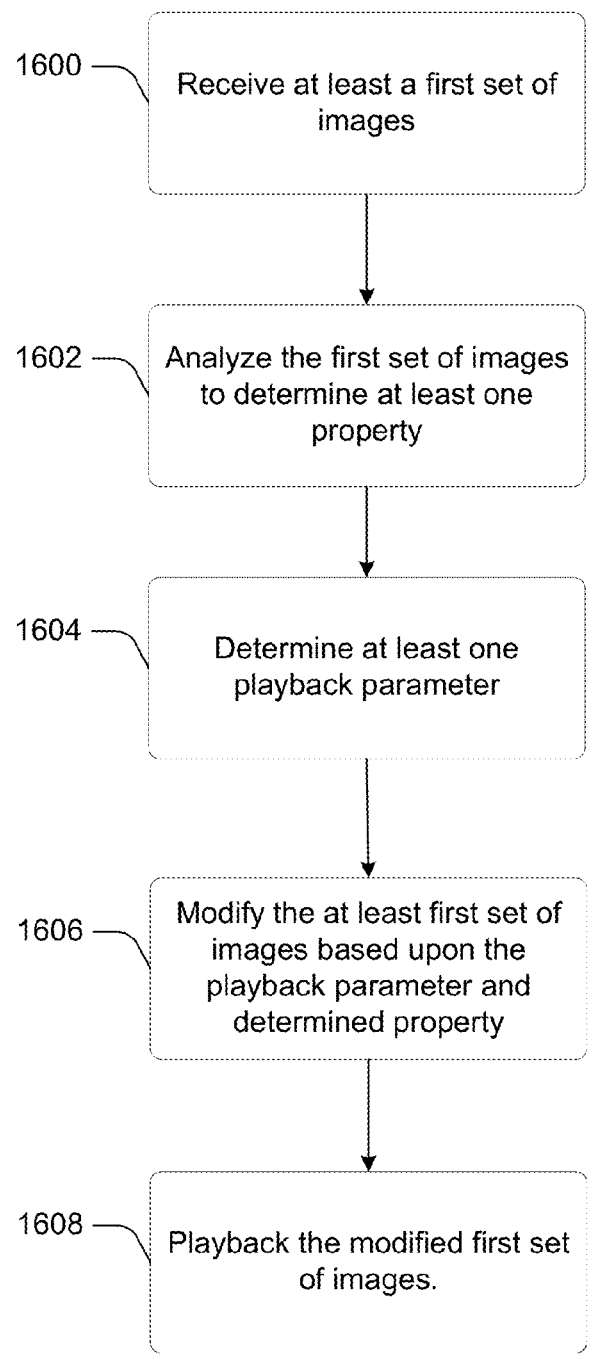
FIG. 16 is a flow diagram that describes steps in a method in accordance with one or more embodiments.

FIG. 16 is a flow diagram that describes steps in a method in accordance with one or more embodiments. The method can be performed in connection with any suitable hardware, software, firmware, or combination thereof. In at least some embodiments, the method is performed, at least in part, by suitably-configured modules, such as image analysis module 114 of FIG. 1.

Step 1600 receives at least a first set of images. In some embodiments, the first set of images is a video that has been captured at a first capture frame rate over a first capture time duration. The set of images can be received in any suitable manner, such as a processing device receiving video captured and transferred by a capture device as further described above. Further, any suitable type of images can be received, such as multiple videos, still images, and/or any combination thereof. When multiple videos are received, the multiple videos can have any suitable configuration, such as each video having a distinct capture frame rate and/or capture time duration from one another, some videos having a same capture frame rate and/or capture time duration, all videos having a same capture frame rate and/or capture time duration, and so forth. The multiple videos can be received together at virtually the same time, or independently from one another at different points in time.

Responsive to receiving the first set of images, step 1602 analyzes the first set of images to determine at least one property. Properties of an image can include any suitable type of property, such as a property based upon image content (i.e. activity present, no activity present, facial recognition, color content, etc.), capture parameters (i.e. time/date stamp, capture frame rate, capture time duration, etc.). In some cases, a property can be a metric that quantifies the content of an image. Properties can be specific to one distinct image and/or a set of images.

Step 1604 determines at least one playback parameter. For example, playback parameters can include playback frame rates, playback time durations, playback time slot locations, and so forth. In some cases, the playback parameter is associated with playing back the images in a photo story. Determining a playback parameter can occur in any suitable manner. In some cases, the playback parameters are predetermined and/or fixed, while in other cases they are dynamically determined, such as a playback frame rate and/or playback time duration based upon a music beat.

Responsive to determining at least one playback parameter, step 1606 modifies the first set of images based, at least in part, the playback parameter and/or the determined image propert(ies). A set of images can be modified in anyway, such as extracting a subset of images from the set that have been identified as being of more interest (i.e. facial recognition, movement detection, etc.), deleting and/or removing images from the set that have been identified as having poor image quality, deleting and/or removing images that have been identified as duplicates (or duplicates to within a threshold), deleting and/or removing images that have been identified as having no movement, and so forth. Alternately or additionally, the set of images can be modified by assigning new playback parameters.

Step 1608 plays back the modified first set of images. In some cases, the modified set of images is played back at a different frame rate than it was captured and/or a different time duration, as further described above. Alternately or additionally, the modified set of images can be played back with synchronized music and/or played back in a photo story.

Having considered the above embodiments, consider now a discussion of an example device that can be utilized to implement the embodiments described above.

Example Device

Figure 17:
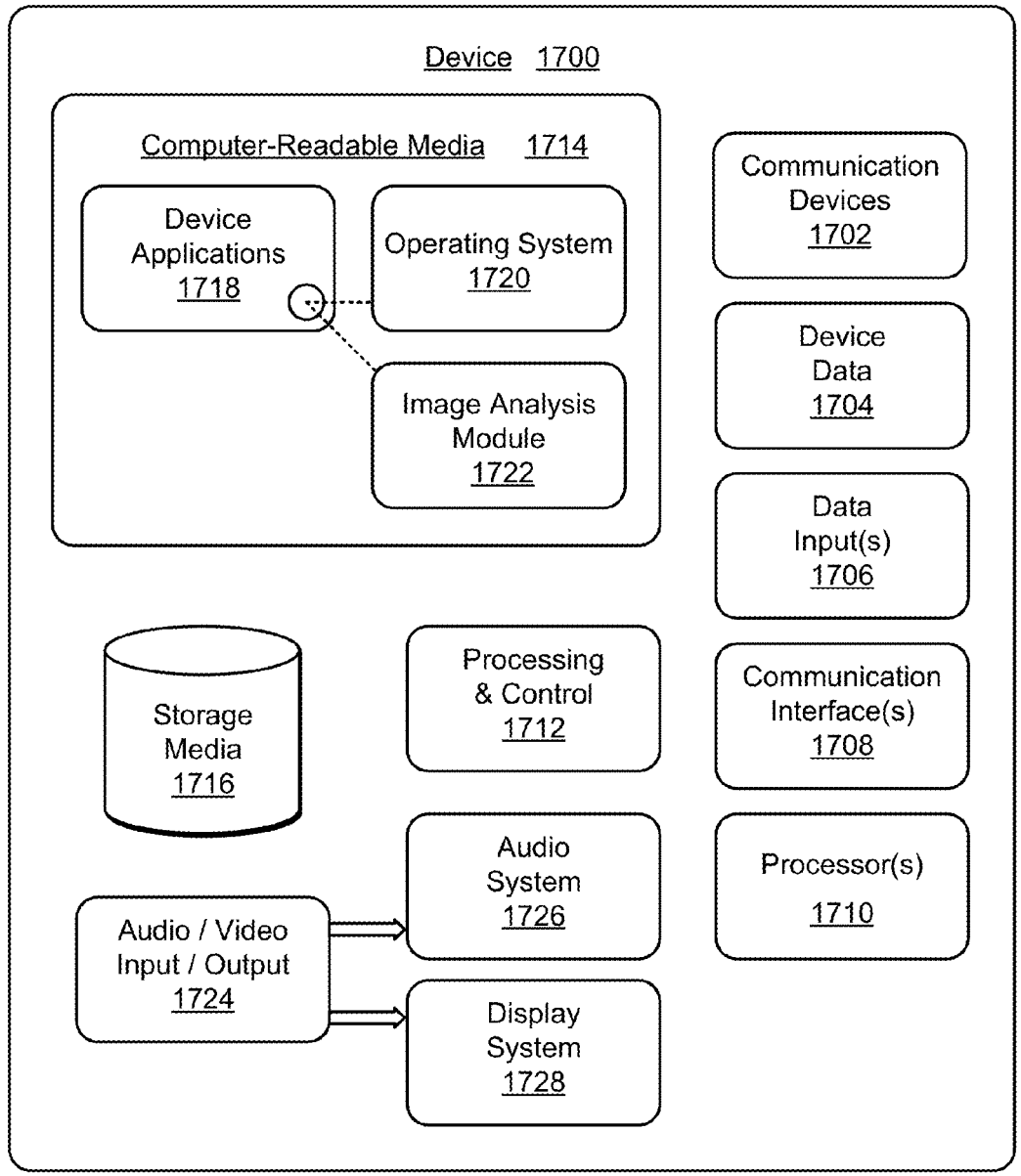
FIG. 17 is an example device in accordance with one or more embodiments.

FIG. 17 illustrates various components of an example device 1700 that can be implemented as any type of portable and/or computer device to implement the embodiments described herein. Device 1700 includes communication devices 1702 that enable wired and/or wireless communication of device data 1704 (e.g., received data, data that is being received, data scheduled for broadcast, data packets of the data, etc.). The device data 1704 or other device content can include configuration settings of the device, media content stored on the device, and/or information associated with a user of the device. Media content stored on device 1700 can include any type of audio, video, and/or image data. Device 1700 includes one or more data inputs 1706 via which any type of data, media content, and/or inputs can be received, such as user-selectable inputs, messages, music, television media content, recorded video content, and any other type of audio, video, and/or image data received from any content and/or data source.

Device 1700 also includes communication interfaces 1708 that can be implemented as any one or more of a serial and/or parallel interface, a wireless interface, any type of network interface, a modem, and as any other type of communication interface. The communication interfaces 1708 provide a connection and/or communication links between device 1700 and a communication network by which other electronic, computing, and communication devices communicate data with device 1700.

Device 1700 includes one or more processors 1710 (e.g., any of microprocessors, controllers, and the like) which process various computer-executable or readable instructions to control the operation of device 1700 and to implement the embodiments described above. Alternatively or in addition, device 1700 can be implemented with any one or combination of hardware, firmware, or fixed logic circuitry that is implemented in connection with processing and control circuits which are generally identified at 1712. Although not shown, device 1700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 1700 also includes computer-readable media 1714, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 1700 can also include a mass storage media device 1716.

Computer-readable media 1714 provides data storage mechanisms to store the device data 1704, as well as various device applications 1718 and any other types of information and/or data related to operational aspects of device 1700. For example, an operating system 1720 can be maintained as a computer application with the computer-readable media 1714 and executed on processors 1710. The device applications 1718 can include a device manager (e.g., a control application, software application, signal processing and control module, code that is native to a particular device, a hardware abstraction layer for a particular device, etc.), as well as other applications that can include, web browsers, image processing applications, communication applications such as instant messaging applications, word processing applications and a variety of other different applications. The device applications 1718 also include any system components or modules to implement embodiments of the techniques described herein. In this example, the device applications 1718 can include an image analysis module 1722 that operates as described above.

Device 1700 also includes an audio and/or video input-output system 1724 that provides audio data to an audio system 1726 and/or provides video data to a display system 1728. The audio system 1726 and/or the display system 1728 can include any devices that process, display, and/or otherwise render audio, video, and image data. Video signals and audio signals can be communicated from device 1700 to an audio device and/or to a display device via an RF (radio frequency) link, S-video link, composite video link, component video link, DVI (digital video interface), analog audio connection, or other similar communication link. In an embodiment, the audio system 1726 and/or the display system 1728 are implemented as external components to device 1700. Alternatively, the audio system 1726 and/or the display system 1728 are implemented as integrated components of example device 1700.

CONCLUSION

Various embodiments provide a capture device, e.g., a camera, that is configured to have multiple capture modes including an image capture mode and a video capture mode. The capture device can be set to the image capture mode in which images or photos are periodically, automatically captured. Upon detection of a particular event, such as an audibly detectable event, the capture device automatically triggers the video capture mode and begins to capture video. After a period of time, the capture device can transition back to the image capture mode. Transition to the image capture mode can occur in various ways, e.g., after passage of a period of time, after the audibly detectable event terminates or attenuates, by way of user input and the like. In some embodiments, the capture device can be embodied as a wearable camera that is worn by a user.

In at least some embodiments, the collection of images and video defines a "photo story" that chronicles the user's day with both still images and video.

Various other embodiments enable a capture device to capture at least one high resolution image and generate a low resolution image based on the high resolution image. Some embodiments transfer an associated low resolution image file to a second device prior to transferring the corresponding associated high resolution image file. In some cases, the low resolution image can be analyzed to determine one or more properties associated with the low resolution image. Processing decisions associated with the high resolution image can then be based on the property or properties of the low resolution image.

Various other embodiments enable a processing device to receive at least a first set of images from a capture device. In some cases, the first set of images is a video clip captured using a first frame rate over a first duration of time. In some embodiments, the processing device analyzes the first set of images to determine one or more properties associated with the images. Based upon the determined properties, some embodiments modify and playback the first set of images at a second frame rate over a second duration of time.

Although the embodiments have been described in language specific to structural features and/or methodological acts, it is to be understood that the various embodiments defined in the appended claims are not necessarily limited to the specific features or acts described. Rather, the specific features and acts are disclosed as example forms of implementing the various embodiments.

What is claimed is:

1. A method comprising:
    enabling, via a capture device, an image capture mode in which images are periodically and automatically captured;
    capturing, via the capture device, one or more images in the image capture mode;
    detecting, while the capture device is in the image capture mode, an audible event;
    responsive to detecting the audible event, automatically triggering, via the capture device, a video capture mode in which video can be captured, the triggering causing the capture device to transition from the image capture mode to the video capture mode;
    capturing, via the capture device, video in the video capture mode; and
    transitioning, via the capture device, from the video capture mode to the image capture mode.

2. The method of claim 1, wherein said detecting comprises capturing sound in the capture device's ambient environment and comparing captured sound to one or more profiles stored in memory of the capture device.

3. The method of claim 1, wherein said detecting comprises capturing sound in the capture device's ambient environment and comparing captured sound to a sound threshold.

4. The method of claim 1, wherein said transitioning comprises automatically transitioning to the image capture mode.

5. The method of claim 1, wherein said transitioning comprises automatically transitioning to the image capture mode after a period of time.

6. The method of claim 1, wherein said transitioning comprises transitioning to the image capture mode after the audible event is no longer detected.

7. The method of claim 1 further comprising providing a photo story comprising chronologically ordered images and video.

8. The method of claim 1, wherein the one or more images and video comprises content, and further comprising grouping at least some of the content according to shared characteristics or properties.

9. The method of claim 1, wherein the capture device comprises a wearable camera.

10. A system comprising:
a capture device configured to:
- capture a plurality of still images in an image capture mode in which the plurality of still images are periodically and automatically captured by the capture device;
- while the capture device is in the image capture mode, detect an audible event;
- in response to detection of the audible event, automatically transition to a video capture mode in which video can be captured;
- capture one or more videos in the video capture mode; and
- transition from the video capture mode to the image capture mode.

11. The system of claim 10, further comprising a processor that is configured to enable grouping of both still images and the one or more videos together.

12. The system of claim 11, wherein the processor is configured to enable grouping by providing the still images and one or more videos to a computing device or remote service sufficient to enable said grouping.

13. The system of claim 11, wherein the processor is configured to enable grouping by enabling both the still images and said one or more videos to be grouped in a photo story in which content is arranged in a chronological order.

14. The system of claim 10, wherein said audible event is detected by the capture device using one or more stored sound profiles to which sound captured by the capture device is compared.

15. A capture device comprising:
a housing;
a camera lens supported by the housing and configured to enable capture of images and video;
a microphone configured to capture sound around the camera device;
a processor configured to perform operations comprising:
- causing the camera lens to capture one or more images in an image capture mode;
- detecting, using at least the microphone, an audible event while the capture device is in the image capture mode;
- responsive to detecting the audible event, automatically triggering a video capture mode in which video can be captured by the camera lens and the microphone;
- causing the camera lens and the microphone to capture video in the video capture mode; and
- transitioning to the image capture mode.

16. The capture device of claim 15, wherein said detecting comprises capturing sound in the capture device's ambient environment and comparing captured sound to one or more profiles stored in memory of the capture device.

17. The capture device of claim 15, wherein said transitioning comprises automatically transitioning to the image capture mode after a period of time.

18. The capture device of claim 15 further comprising providing a photo story comprising chronologically ordered images and video.

19. The capture device of claim 15, embodied as a wearable camera.

20. The capture device of claim 15, wherein said automatically triggering causes the capture device to transition from the image capture mode to the video capture mode.

* * * * *